INVENTOR.
JOSEPH WINTER
BY
Robt. & H. Bachman

Aug. 13, 1968     J. WINTER     3,397,045
COMPOSITE METAL ARTICLE
Original Filed Oct. 2, 1962     8 Sheets-Sheet 6

INVENTOR.
JOSEPH WINTER
BY

Aug. 13, 1968     J. WINTER     3,397,045
COMPOSITE METAL ARTICLE
Original Filed Oct. 2, 1962     8 Sheets-Sheet 8

INVENTOR.
JOSEPH WINTER
BY Robert H. Bachman

United States Patent Office 3,397,045
Patented Aug. 13, 1968

---

3,397,045
COMPOSITE METAL ARTICLE
Joseph Winter, New Haven, Conn., assignor to Olin
  Mathieson Chemical Corporation, a corporation of
  Virginia
Original application Oct. 2, 1962, Ser. No. 229,262.
  Divided and this application May 23, 1966, Ser.
  No. 565,664
5 Claims. (Cl. 29—191)

ABSTRACT OF THE DISCLOSURE

An integral composite sheet metal article having good bond strength, with the core and cladding being bonded together in direct metal-to-metal contact and with the interface between the core and cladding being characterized by having greater contact area between core and cladding than between planar sheets and having a wavelike interface with a plurality of peaks, said peaks being irregular in distribution and having a greater length than height.

---

This application is a division of co-pending application Ser. No. 229,262, filed Oct. 2, 1962, now abandoned.

The present invention relates to methods for developing changes in the surface properties of elements. More particularly, it relates to the improvements in joining together of deformable elements which elements, at the time of joining, exhibit different degrees of deformability.

Although a great deal of information is available in the patent and other literature dealing with the joining together of materials, there is very little fundamental information on the mechanism by which one substance can be bonded directly to another. Basically, there is no known property within most formable, or deformable substances, the presence of which property can be expected to prevent or preclude the direct joining together of distinct species of deformable substances in practically limitless combinations. Quite the converse, it is the practical difficulties of bringing materials into what might be called bonding contact, which limits the combinations of substances which can be joined directly.

It has been stated recently that in the conditions of outer space many combinations of substances which are not conventionally thought of as bondable will be subject to direct bonding due to the interdiffusion of atoms therebetween. Such diffusion bonding in the special environment of outer space is expected in fact to provide the problem of finding some way to retard or prevent diffusion bonding rather than to promote or induce it.

The more practical problems of the direct bonding together of distinct species of substances is that of providing such conditions as permit interatomic forces to be formed over extensive interfacial areas between the individual atoms of the distinct substances. It is the practical limitations on providing such conditions which limit the direct bonding of various combinations of substances rather than inherent properties of the substances themselves.

The requirements for forming direct interatomic bonding forces between distinct elements has been treated at length by Goetzel in this book on Powder Metallurgy. In this treatment Goetzel puts the requirement in terms of proximity and mobility. In an oversimplified statement of these requirements proximity might be described as a requirement for a certain closeness of approach of the atoms of the two substances. Mobility might similarly be described as a requirement for a level of energy of the atoms in close proximity which permits the interatomic forces to be established between atoms of the two substances.

Although the basic requirements for direct bonding of distinct species of materials can be stated simply in this way, there is no simple basis on which predictions can be made as to the practical techniques by which materials can be bonded directly to similar or to distinctly different materials. Similarly, the precise methods which must be used to obtain successful bonding, or optimum bonding, are not readily predictable for new combinations of materials.

Of particular significance in the joining of materials to form composite structures is the development of a strong initial bond between the elements of the structure. For example, it is possible by various practices to develop a transitory or partial initial bond between component elements so that the combination will exhibit temporarily the properties of a composite structure. However, only limited further use of the structure, or limited further forming of the structure to make a useful product can be carried out without first treating the "transition" composite structure to increase the degree of bonding between the component elements of the composite.

In the art of joining materials by developing direct bonds therebetween, there is, in addition to the practical problems of providing conditions which will promote the bonding, the problem of providing such conditions by means and procedures which are economically competitive with other bonding methods, and the problem of producing bonded articles in commercially useful form. Pursuant to one aspect of this invention direct bonds are formed between mechanically deformable elements to produce articles in commercially usable form and at commercially competitive costs.

In the invention described herein the joining of mechanically deformable elements refers to the development of cohesive or adhesive bonding forces directly between component elements of an assembly to form a composite body by the mechanical deformation of the elements which constitute the body. By a formable or deformable element as used herein is meant a body of material having a physical form which is independent of a container in which it may be situated and which is capable of undergoing a change to a distinct independent form by the application of conventional deforming energy thereto. By conventional deforming energy as used herein is meant one of the operations for working bodies such as spinning, swaging, rolling, drawing, cupping, forging, stamping, and the like.

An illustration of the type of composite structure, for which improved techniques of production are desirable, is that group of clad composite sheet and plate articles which are commonly formed at the present time by pressure bonding, making use of a roll forging operation. Numerous clad products, that is composite products having a relatively thin layer of one material bonded to a thicker substrate of another material, are formed on a large scale commercially by roll forging. A specific illustration of a desirable product, which cannot be produced by known roll forging methods, is a sheet of a metal such as aluminum covered with, and bonded directly to a continuous adherent skin of wrought stainless steel having a specified thickness, and formed by a rolling process carried out under normal atmospheric conditions. While stainless steel clad aluminum composites can be formed by known methods through use of processes which depend on employment of special atmospheres, or the incorpartion of transition layers of material between the assembled layers of aluminum and stainless steel, or by similar aids to bonding, no process has been known heretofore for cladding an aluminum substrate by a direct bond to stainless steel foil in a roll forging operation. It is apparent that substantial economy results where a direct bonding can be produced in a single pass without the use of the aids to the formation of a bond between the stainless steel and aluminum, as is necessary where these materials are joined by methods other than that taught herein. A substantial body of art has developed around solutions to the problem of cladding a base metal with an adherent surface layer of a second metal having properties distinct from those of the base material. The number of combinations of metals which can be joined in this way has been limited for numerous reasons. A principal reason, as pointed out above, is the difficulty of forming a strong direct bond between the surface layer and the base metal. Various bonding agents, special atmospheres, surface treatments intermediate or transition layers, and the like have been used to make the joining possible, or to improve properties of the clad product or of the bond itself. However, the use of each of these aids adds cost to the process used and accordingly to the product formed. Because of the difficulty of processing and the high cost, many desirable clad products are not available as products of commerce. Moreover, because of technical difficulties of forming certain clad products, such as composite sheets having a refractory metal layer bonded directly to a substrate such as aluminum, such products are not available commercially.

One reason why substrates clad with refractory metals are not more readily available is the extreme difficulty of overcoming or avoiding the influence of bond inhibiting surface films formed on their surfaces during the preparations for bonding. Regarding such bond inhibiting layers, it is known that generally the heating of metal elements to be joined improve the strength of the bond formed by pressure bonding where the heating does not increase the inhibiting influence of the surface layers. However, it is also well known that the heating of many metal elements produces bond inhibiting surface layers in a degree which either reduces the bond strength or completely prevents formation of the bond. The heating of such elements therefore both works for and against the improvement of the bond strength of bonds formed between such elements. For many metals, particularly the refractory metals and others which are more reactive with atmospheric oxygen, such heating reduces or prevents pressure bonding.

Numerous successful techniques for producing composite metal products in sheet form by roll forging are described and discussed as, for example, in an article entitled "A New Development in Metal Cladding" by George Durst appearing in the March 1956, issue of the Journal of Metals. Many of these techniques are suitable for forming composite sheets from particular combinations of metals, or from combination of metals having prerequisite combinations of properties—physical, mechanical, metallurgical, and chemical. From the discussions of forming composite sheets appearing in such articles, it is also evident, however, as has been pointed out above, that while they offer advantages in the joining of certain pairs of metals, they cannot be used successfully in joining others.

Another successful technique for producing composite metal products in plate form is described in an article in the Mar. 4, 1961, issue of Iron Age, wherein the joining together of plates of metal through the use of explosives welding techniques is described. One phenomena which is described to be of particular significance in this method of joining is the flow of metal at an intersurface by a mechanism which the authors refer to as "surface jetting." In discussing this mechanism, or underlying principle of the use of explosives in the welding of plates, the authors point out that theoretically, if two clean metallic surfaces are placed in perfect contact, cohesive forces between the atoms should hold them together, but that because metals are almost always polycrystalline, surfaces of most metal articles are irregular. They observe further that a high pressure, causing the surfaces to slide over one another and thus eroding the irregularities, would bring the surfaces into closer contact. The method which is disclosed in this article is that of projecting the two plates to be welded at each other by the use of simultaneously exploded sheets of explosive so that the plates impact at high velocity. From photomicrographs of the welded interface the authors conclude that metal at the interacting surfaces produces a swirling effect called "surface jetting."

It is evident that although use of this surface jetting, as a form of surface agitation produced during explosive welding, is very advantageous in the bonding of metals together, the explosive welding process itself is extremely limited as a method for forming composite articles of commerce on a large scale and at a low cost.

The difficulties of forming a direct interatomic bond with a metal in an assembly increases generally as the melting point and the surface reactivity increase. Accordingly, if metals are grouped into their common classes of noble metals such as gold and platinum, low melting metals such as tin and lead, the common structural and industrial metals, such as copper, steel, iron, and aluminum, the reactive group, such as titanium, zirconium, and the refractory group, such as tungsten, tantalum, and molybdenum, it is evident that the greatest difficulties are found in forming interatomic bonds where one metal of the assembly is selected from one of the last two groups. This is evident from the high cost of composite metal products where a metal of an alloy of a metal of the last two groups constitutes one of the metals of the composite.

The novelty and advantages of the present invention will be more readily evident therefore in those applications which produce direct bonding between diverse combinations of elements where at least one of the elements is selected from the last two groups indicated above or alloys predominantly composed thereof. It will be also evident, however, that the present invention has application in the bonding of an extremely broad range of materials, including materials selected from the other groups indicated above, as well as other materials having properties of deformability which correspond to those of the materials of the indicated groups or which have other suitable deformability properties as described more fully below. It will further be evident that although the invention makes possible the bonding of new combinations of materials, it also has broad utility in improving many bonding operations which depend on more conventional practices as well as on the use of various aids to bonding such as the use of special atomspheres, surface coatings, and the like, referred to above.

It is one object of the present invention to provide novel composite products not heretofore available.

Another object is to provide composite metal products of improved combinations of properties.

A further object is to provide an improved method for the bonding together of elements having different plasticities.

An additional object of the invention is the provision of a direct bonding between deformable elements exhibiting different degrees of plasticity.

A further object is to provide improved methods of joining metal elements.

Still another object is to provide an improved method for forming bonds directly between elements exhibiting plastic properties.

Still another object is the provision of composite metal products having less bonding agents between the component elements thereof than has been heretofore necessary, but having equal or improved bond strength when compared to the bond strength achieved with greater amounts of such bonding agents.

Still other objects and advantages of the invention will be in part apparent and in part pointed out in the description which follows.

In one of its broader aspects certain objects are achieved by bringing together elements which exhibit plastic flow properties to establish an intersurface therebetween and deforming said elements to establish a strong shearing force in a region proximate said intersurface at a rate to generate a quasi-turbulent movement of the material in the regions of said intersurface.

The invention and the manner in which it is practiced will be understood with greater clarity from a consideration of the accompanying drawings in relation to the examples and description which follows in the drawings.

Figure 1A:
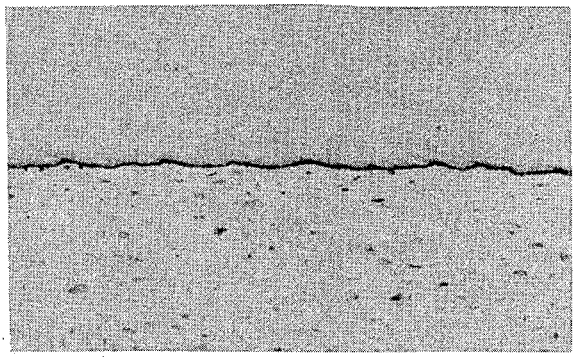
FIGURE 1A is a photomicrograph at high magnification illustrating the contour parallel to the rolling direction of an interface formed directly between specimens of stainless steel and an alloy of aluminum by roll forging.
Figure 1B:
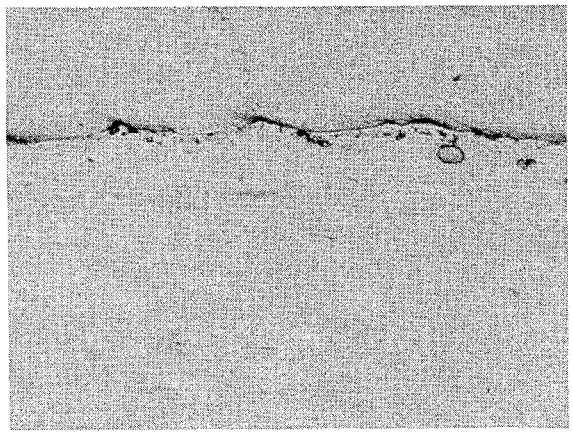
FIGURE 1B is a photomicrograph similar to that of FIGURE 1A but at a higher magnification.

Before entering into a description of the method by which the novel results of the present invention are brought about, and for a clearer understanding of the invention, a description is given here of the certain unusual characteristics of the products which are formed. For this purpose reference is first made to FIGURES 1A and 1B which are magnified photomicrographic views of the cross-section of the interface formed between a surface cladding of stainless steel bonded directly to a substrate of an aluminum alloy, where the clad product was formed by roll forging in accordance with this invention. The cross-section of the interface of FIGURE 1A was made generally parallel to the rolling direction and is shown at a magnification of approximately 500 fold after the specimen was polished to exhibit the interface, and after the polished specimen was slightly etched with a 0.5 percent aqueous solution of hydrofluoric acid. FIGURE 1B is a similar photomicrograph which shows the interface cross-section at a magnification of approximately 1000 fold. The upper portion of the figures shows the stainless steel, and the lower portion, the aluminum.

One of the novel properties of certain clad products formed in accordance with this invention is the existence of an agitated zone in the region of the interface. This is evidenced by severe strain markings of the photomicrographs in the metal proximate the interface.

This strain is evident in the stainless portion of the metal adjacent the interface from the configuration of severe strain markings which start at the interfacial region, and which extend for a distance into the stainless steel metal in the upper portion of the figure. As seen these markings lose their intensity as they extend further distances from the interfacial line. Another identifying characteristic is the concentration of the strain markings which start at, and which are aligned generally parallel to, one face of peaks or crests which appear in the contour of the interfacial line. It is further evident that a number of peaks of lesser elevation in the interfacial line are also the location of concentrations of strain markings, which markings can also be seen to start from this interfacial region.

The configuration of the strain markings at the interface, and the lessened intensity of the markings at greater distances from the interface, are indications of a condition of severe strain which was developed at the interfacial region at the time of formation of the interface. The pattern of the lines in the microstructure, as shown by the photomicrographs of FIGURES 1A and 1B, further indicate that the strain which existed at the time of formation of the interface followed a pattern of periodic buildup to greater strain concentration or intensity, as evident from the peaks showing penetration of the aluminum into the stainless steel, separated by regions of lessened or reduced strain indicated by the troughs between the peaks of aluminum, as the line of the interface was progressively established during the roll forging operation. In FIGURES 1A and 1B the interface between the stainless steel and aluminum was formed from right to left, as viewed in the figures, as the metal assembly moved from left to right in passing between the rolls in the roll forging operation.

Figure 2A:
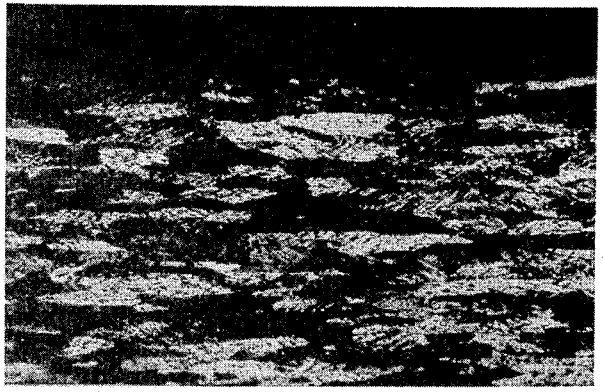
FIGURE 2A is a photomicrograph of an interface corresponding to that in FIGURE 1 but taken at a lower magnification and after the sectioned specimen was etched to emphasize the grain structure in the aluminum.
Figure 2B:
FIGURE 2B is a photomicrograph showing a portion of FIGURE 2A at a higher magnification.

Referring now particularly to FIGURES 2A and 2B, interface cross-sections corresponding generally to those shown in FIGURES 1A and 1B are seen. These sections are prepared to exhibit the grain structure in the aluminum component of the composite product in the lower part of the figures. The aluminum grain structure is clearly defined as a result of anodizing the polished specimen and because the anodized surface is viewed with the aid of polarized light. The stainless steel side of the interface appears black at the upper part of FIGURES 2A and 2B under this lighting. FIGURE 2A shows the aluminum grain structure at the interface at a magnification of about 100 fold, and FIGURE 2B shows the central portion of FIGURE 2A but at a magnification of about 500 fold. It is evident from these figures that the interface is characterized by an irregular contour having peaks or crests although such peaks are less distinct than in FIGURES 1A and 1B. The photomicrographs are also characterized by the presence of severe strain markings which start at the region of the interface and which diminish in intensity at increasing distances from the interface.

It is further evident from the grain structure in the aluminum, particularly as seen in FIGURE 2A, that the energy applied in deforming the specimen by the roll forging thereof was concentrated to a significant extent in the material proximate the interface. This concentration of the work energy is evident from the contrast between the grain structure proximate the interface and that at greater distances from the interface.

Several other aspects of the invention will be described with greater particularity in the portion of the specification which follows. It is believed that it will be of considerable assistance in understanding the invention, and the methods by which it may be carried into effect, if a description is given here, and at other appropriate portions of the specification, of the principles underlying the invention, although it will be understood that this description is given for explanatory purposes only and that the operability of the invention, or the validity of the claims made thereto are not to be considered to be dependent on the accuracy of the description of underlying principles and explanation given.

Briefly, it has been discovered that it is possible, through the use of certain novel combinations of material forming or deforming operations and steps, to concentrate strain producing forces in the region of an intersurface and to induce what is essentially an agitation of material at an intersurface between two elements having suitable characteristics. Further, it has been found that through this induced agitation it is possible to cause a greatly increased exposure of nascent surface at the intersurface and a greatly increased contact between the materials of the elements at the intersurface in a manner which enhances the development of adhesive or cohesive forces, i.e., bonding forces, between the materials. Before going into the explanation of the phenomena which is believed to be responsible for the improved results obtainable in the practice of this invention, it should be understood that although there is a general resemblance between the surface agitation induced in the practice of this invention and the surface jetting of the explosive welding method referred to above, the manner in which these respective phenomena are produced are distinct, and there are recognizable distinctions between specimens of material produced by the respective methods as will be more fully evident from the discussion below.

With regard to the underlying principle of the operation of the subject invention, the illustrated interfacial irregularity and severe strain lines in the region of the interface of FIGURES 1 and 2 are deemed to be evidence of an undulating agitation of the material of the intersurface as the interface was formed during the formation of the composite sheet product.

For an explanation of the manner in which this unique surface agitation is produced in accordance with the present invention we turn now to a consideration of a pattern of material flow which occurs at the surface of a material when it is subjected to the novel combination of steps and operations which produce the novel surface agitation. For the purpose of this explanation reference is made to what may be considered an analagous material flow phenomena which is observed in the flow of fluid materials. It is not proposed that the underlying principle of the operation of the present invention is the same as the underlying principle of the fluids flow phenomena discussed herewith, but an analogy is drawn between the flow pattern of the material which exhibits plastic flow properties, particularly proximate and at the interface, and the flow pattern of a fluid material, in order that the basis for the selection of the several alternative combinations of operating steps and procedures discussed below will be more readily understood by one seeking to practice this invention.

In a simple model, representing the mechanism of the flow of a liquid through a tubular conduit, such flow may be pictured as depending largely on the consumption of an applied flow-inducing energy by the movement of concentric layers of fluid in a manner similar to the extension of the concentric tubes of a telescope, as the telescope is extended from a contracted or closed position, to an extended or open position.

Figure 11:
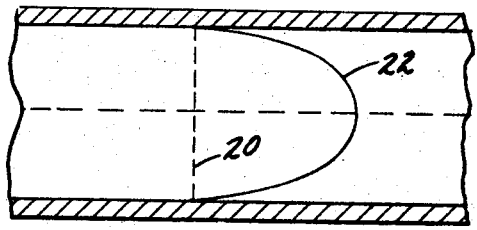
FIGURE 11 is a profile view of the pattern of flow of fluid through a conduit of regular cross-section under laminar flow conditions.

Referring for convenience to FIGURE 11, this laminar or viscous pattern of flow of liquid through a conduit can similarly be represented as the final profile 22 which is assumed by a line of material 20, initially extending diametrically across the width of the fluid in the tube at an initial point in time, if allowed to follow the path of the fluid flow existing within the conduit for a given time interval $t$.

In the simple model this flow profile is produced by what is effectively the sliding of layers of fluid within the conduit of circular cross-section, the innermost tube moving at the faster liner rate, and traversing the greatest linear distance in time $t$, and the adjacent outer tubes moving at progressively slower rates until the outermost tubular layer is reached. This last layer is usually in contact with the conduit wall and may be effectively stationary in that position if there is a sufficiently high flow inhibiting friction between the outer layer and the surface of the conduit. From FIGURE 11 it is also evident that although the largest linear displacement of fluid takes place at the center of the tube, the largest differential displacement of fluid per unit depth of flowing fluid takes place proximate the tube walls.

Generally, as an increase is made in the amount of energy applied in urging the forward motion of a fluid relative to the containing conduit, where the fluid is flowing in a laminar flow pattern, and no change is made in the other factors affecting the fluid flow, the rate of movement of the faster flowing layers is increased, and a greater difference is developed between the rate of movement of the fastest moving layer and the rate of movement of the slowest moving layer. In other words, with increased laminar flow rate a greater differential rate of flow is established in a given depth or thickness of the fluid normal to the plane of contact of the apparent layers thereof, this increased differential flow rate corresponds, within a given time interval $t$, to an increased differential linear displacement established within a unit depth of the fluid body.

However, in this simple model of a fluid flow system, when a rate of movement between the "layers" of a fluid, or the differential rate of movement in a unit depth of the fluid body undergoing a laminar pattern of flow, is increased beyond a certain critical value, a component of the flow-inducing energy, otherwise absorbed by the movement of the concentric layers parallel to the tube axis, is absorbed instead as a component of motion normal to the axis of the tube or, where the conduit is not tubular, in a direction normal to the plane defined between the moving layers of fluid. In other words, as the amount of applied flow-inducing stress is increased, there is an increase in the differential rate of movement of these contiguous layers within the fluid. However, because of certain inherent properties of the material undergoing flow, when the differential rate of movement exceeds a certain critical value, stress forces are established normal to the plane of contact of the contiguous layers and a transverse agitation of the material is created at the plane of contact sufficient to disrupt the laminar flow pattern of the fluid and to convert this flow to the turbulent type.

It should be understood that although the simple mechanism described above will be useful in depicting the underlying principle of the invention described herein, in actuality there are numerous factors in addition to the differential flow rate of contiguous layers which have an effect on the development of turbulence-inducing shear forces within a fluid, and that turbulence can be developed at relatively low differential flow rates by appropriate adjustment of other factors. Many of the factors have been recognized and are discussed in detail in standard reference books such as Perry's Chemical Handbook. As pointed out therein, for certain of these factors, the influence which they have on the development of turbulence is known, and quantitative values are given through equations and graphs for establishing the proper conditions for development or for avoiding the development of turbulence. However, an additional number of the factors which influence turbulence are not subject to quantitative determination and must be handled largely on an empirical basis.

A parallel to the above described phenomena, observed in the flow of fluids, exists also in the plastic flow of materials during the plastic deformation thereof. The principle which underlies the present invention is that it has now been discovered that what is referred to herein as quasi-turbulent plastic flow may be employed to induce an agitation at an intersurface between two elements at least one of which exhibits plastic flow properties during the deformation thereof. It has further been discovered that when certain prerequisite conditions, as more fully described below, are observed in the inducement of this quasi-turbulent plastic flow, bonding forces can be established between elements to create or improve the bonding between the elements. In other words, it has now been discovered that it is possible to deform elements which exhibit plastic properties under such conditions that the surface agitation developed at the intersurface therebetween creates a permanent bond directly between the elements.

Patterns of plastic flow

One way in which quasi-turbulent flow is developed within a body which exhibits plastic flow during the deformation thereof, can be illustrated with reference first to the plastic flow which occurs during the roll forging of a single element which exhibits a uniform plasticity, and by contrasting this with the flow which occurs during the roll forging of assemblies of two elements, each of which independently exhibits uniform plastic flow properties, but at two distinct levels of plasticity.

Figure 12:
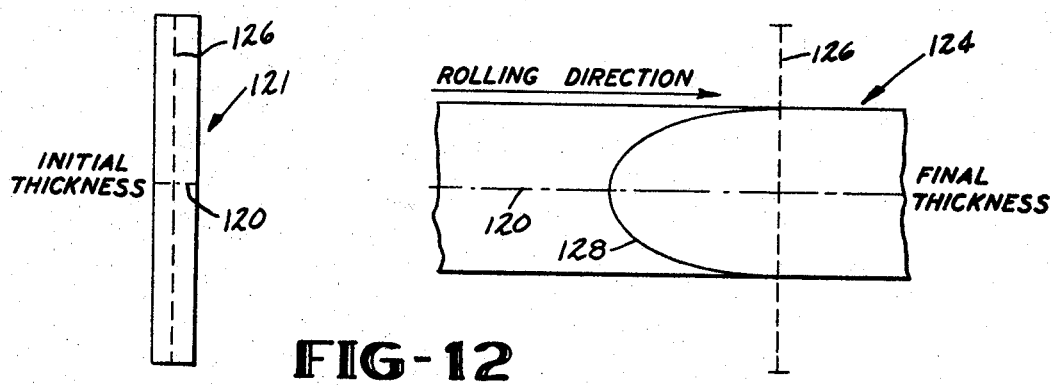
FIGURE 12 is a similar sectional profile view of the plastic flow in a material of uniform plasticity following a single pass through a roll forging operation.

For this purpose reference is first made to FIGURE 12 which shows a vertical central sectional view through a specimen segment of sheet 121 taken in a plane lying perpendicular to the sheet surface and parallel to the direction in which the specimen is to be rolled. The dotted vertical line 126 through the sheet lies at the intersection of two vertical planes, the first of which is a vertical plane normal both to the sheet surface and to the rolling direction, and the second of which is the central vertical cross-sectional plane through the specimen. Line 126 can be thought of as an initial contour line of the material of the sheet which lies along the intersection of these two vertical planes. As seen in FIGURE 12, the specimen 121 is a short segment of the sheet specimen which is represented at the left in its initial thickness dimension. Initial contour line 126 has a height corresponding to the initial thickness of the sheet, that is, the thickness prior to the roll forge reduction of 50 percent.

A section 124 of the sheet seen in the right hand portion of FIGURE 12 depicting a central vertical section through the thickness of a segment of the sheet specimen following the 50 percent roll forge reduction. The contour line 128 is the approximate contour through the material of the sheet of specimen 121 which was initially aligned along the contour line 126.

As indicated from the figure as the rolling occurred the material moved from left to right through counter-rotating rolls, the lower roll of which rotated in a clockwise direction. During the rolling reduction, the material in the sheet initially aligned along line 126 was displaced from right to left in the central portion of the specimen. From FIGURE 12 it is evident that this final contour 128 has a generaly symmetrical shape, the symmetry of which exists on both sides of a center line 120 passing through the horizontal center, both of the reduced specimen 124 after rolling, and the specimen 121 before rolling. There is, in other words, no vertical displacement of material along the central horizontal line as a result of the rolling reduction, where the specimen exhibits a uniform plasticity or deformability. Further, it will be noted that the line 128 extends in a symmetrical fashion from one surface of the specimen 124 to the other, and that it terminates at points at the surfaces which correspond approximately to the points on each surface through which the contour line 126 originally passed prior to the reduction.

In the description which follows of the figures representing changes in contour lines by roll forging, the alignment of the specimens and of various planes and lines through the specimens is substantially according to the above description except where some indication is given to the contrary.

Figure 13:
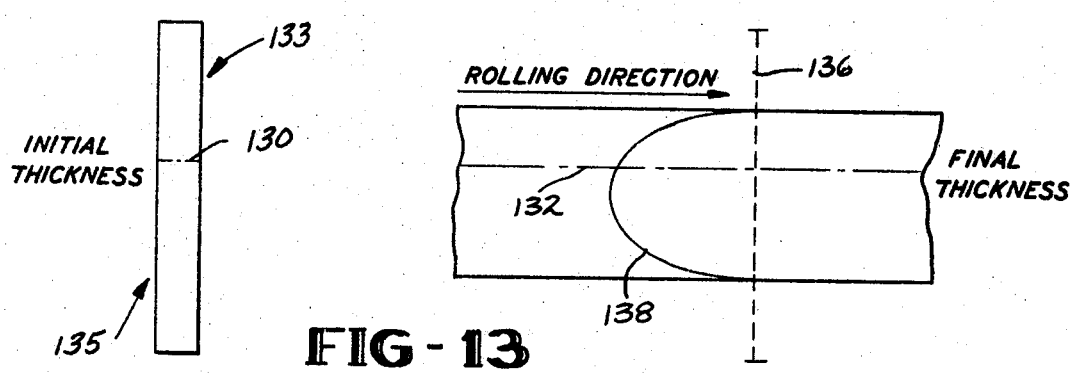
FIGURE 13 is a profile sectional view of the approximate final configuration of a vertical line which initially extended through a composite assembly prior to roll forging and showing the linear displacement of the line from its initial position.

Referring now to FIGURE 13 cross-sectional profiles of segments of sheet specimens are shown in the manner indicated above with respect to FIGURE 12. In FIGURE 13 a segment of an assembly of specimens, each of which individually exhibits symmetrical deformation properties, is shown both before and after processing through a roll forging operation. It is assumed for this case that the deformability or plasticity of the two materials of the assembly are essentially identical. An intersurface between the pre-rolled specimens 133 and 135 is shown as a line of dashes and dots 130, and the interface formed by rolling is shown by a similar line of dots and elongated dashes 132. The final contour line extending vertically through the specimen prior to rolling, will have approximately the same contour as the line 128 of FIGURE 12.

Figure 14:
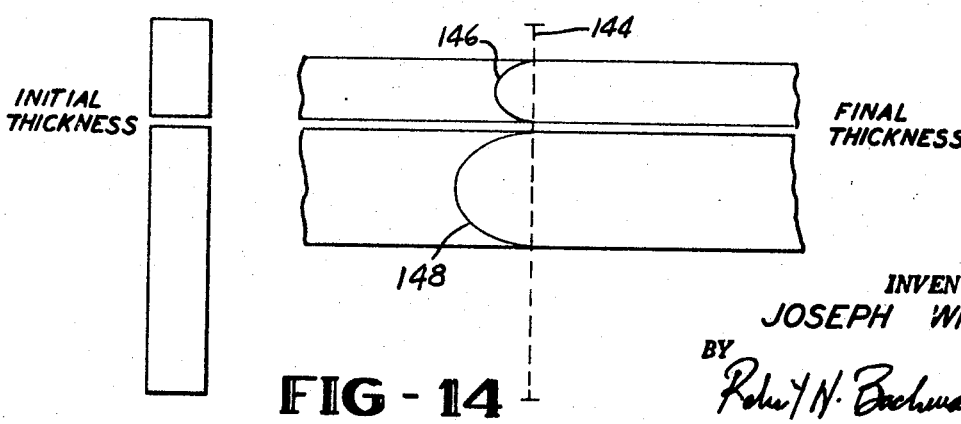
FIGURE 14 is a profile sectional view similar to that shown in FIGURE 13 but indicating the independent plastic flow within an assembly of strips of different plasticities.

Referring now particularly to FIGURE 14 there is illustrated in the manner described with reference to FIGURE 12, the initial and the final product formed by the reduction of two elements assembled in a hypothetical duplex assembly of specimens for roll forging. Each specimen has a uniform plasticity but the plasticity of each was at a distinct and different level during the roll forging operation. It is assumed for the purpose of this illustration that no interaction takes place in the region of the intersurface and this intersurface is accordingly shown as a double line, although it will be appreciated that this absence of any interaction at the intersurface represents a rather unusual set of facts. The two final contour lines 148 and 146 indicate the shape assumed by the initial straight line 144 extending through the specimens as it existed prior to the roll forging operation.

Figure 15:
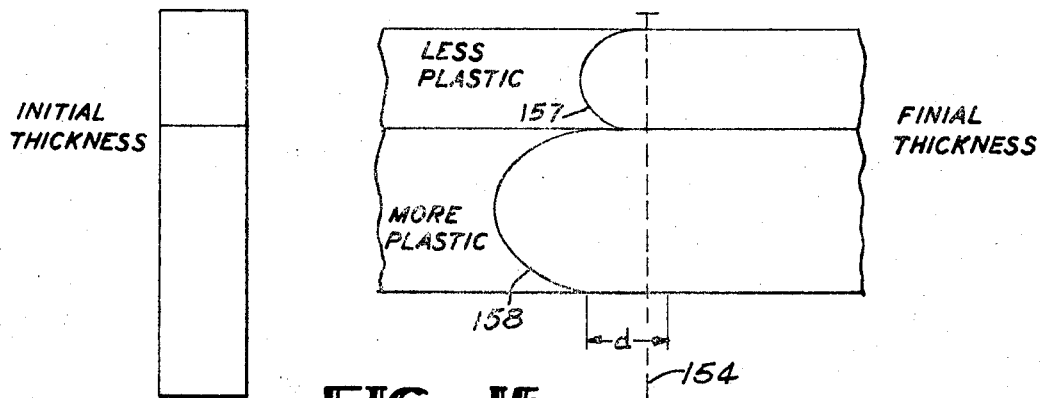
FIGURE 15 is a profile view similar to FIGURE 14 but showing an interdependent plastic flow pattern within a similar assembly.

Referring now to FIGURE 15 another hypothetical plastic flow contour pattern is illustrated for the case in which a thinner specimen of lower plasticity is rolled in contact with a thicker specimen of higher placticity, employing roll forging conditions which do not come within the method of the present invention. In this illustration, as contrasted with that for FIGURE 13, an appreciable amount of intersurface friction is assumed to occur. In this case the more plastic material is deformed in a pattern which is more or less an intermediate between the pattern of the final contour 138 of FIGURE 13 and the final contour 146–148 of FIGURE 14. In FIGURE 15 it will be observed that the contour lines 157 and 158 represent the contour line 158 of the less plastic material as originating at the point at which the initial contour line 154 originated, but that the point of origin 156 of the more plastic material from the external surface of the assembly is displaced by a distance $d$ from the original alignment 154 through the duplex assembly. This linear displacement of the point of origin represents a differential extension of the external surfaces of the more plastic material. As the degree of this differential extension of the surface of the more plastic material increases, there is an increase in the differential displacement distance $d$.

The final line 157–158 of FIGURE 15 represents the contour which may be expected to be found in many roll forged duplex assemblies of less plastic material with more plastic material, where no bonding, or a very limited bonding occurs at the intersurface between the materials.

Figure 16:
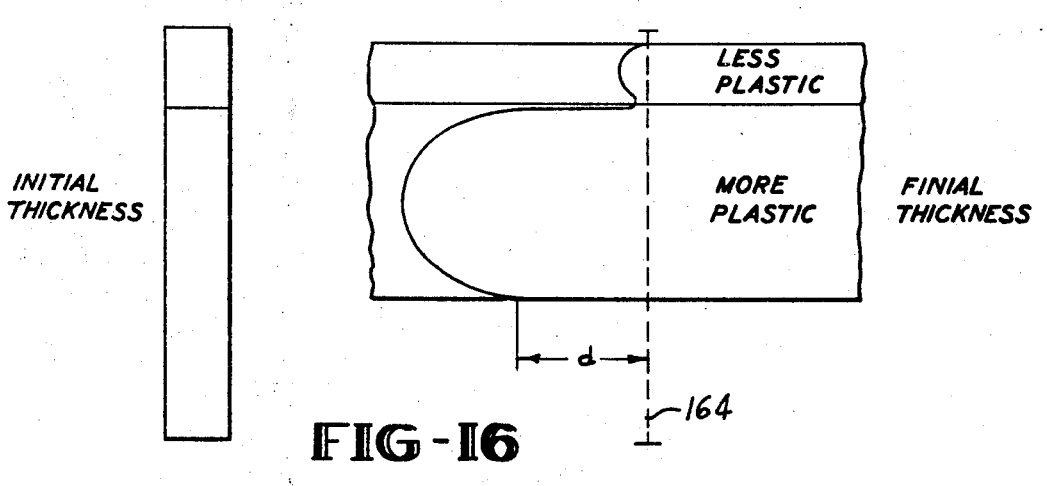
FIGURE 16 is a profile view similar to FIGURE 15 and showing a greater interdependence of flow than that shown in the previous figure.

Referring now particularly to FIGURE 16 the results of roll forging of a duplex assembly of a more plastic and a less plastic material is shown. The generalized contour of the line indicates the results of a stronger attraction between the less plastic and more plastic material at the intersurface than that indicated by the final contour of FIGURE 15, and may indicate a degree of bonding between the two materials at this intersurface which is greater than that shown in FIGURE 15. Where the roll forging of specimens to produce a final contour, such as is indicated in FIGURE 15, also results in a disruption or agitation of the intersurface in a characteristic manner which is described more fully below, this roll forging constitutes a practice of the present invention and, for convenience, is referred to as one form of positing. Where the characteristic disruption of the intersurface contributes to the production of a bonded interface, it is referred to as one form of posit bonding. As plotted in FIGURE 16 there is a further enlargement of the differential displacement distance $d$. This is at least partly due to an increased formation of new surface at this face due to the greater extension of the material thereof. It will also be observed that the plot of FIGURE 16 indicates that there is a substantial increase in the degree of the extension of the intersurface relative to the extension of the external face of the less plastic material.

Of considerably greater importance for the purposes of understanding one aspect of this invention is the indicated degree of extension of the material of the more plastic material in the region immediately proximate the intersurface or, if bonding has been completed, immediately proximate the interface. Referring again to FIGURE 16 there is shown a relatively long and nearly flat section in the contour line 168 almost parallel to the intersurface and indicating that there is a very large differential rate of flow through a unit thickness of the more plastic materials in the region of this material proximate the intersurface.

Figure 17:
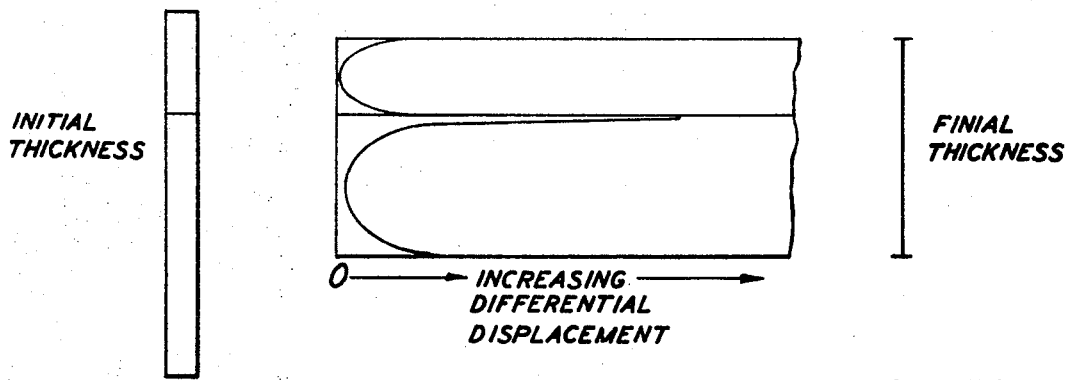
FIGURE 17 is a profile view similar to that shown in FIGURE 16 but having an approximate plot of differential flow of material exhibited thereon rather than the approximate profile of the flow itself shown in the other figures.

The significance of this specified high plastic flow region may be represented more clearly by reference to FIGURE 17 which illustrates an approximation of the relative degree of differential displacement of the plastic materials of the duplex assembly during the period when the assembly is under plastic flow. It will be seen that the peak value of differential displacement through a unit thickness of the composite material occurs in the region of the more plastic material which is immediately adjacent the interface formed between the more plastic and the less plastic materials.

In the practice of the present invention it is an object to so increase the differential flow of the more plastic material occurring at the intersurface region that the critical value of differential plastic flow is exceeded and a quasi-turbulent plastic flow is induced in this region. This induced quasi-turbulence causes a transverse agitation of the material at the intersurface and effectively increases the opportunity for the development of interatomic bonds between the materials of the component elements and accordingly across the intersurface.

It will be understood, however, that in the practice of the present invention, although the development of a quasi-turbulence at the intersurface depends partly on the large differential rate of plastic flow in the region proximate the intersurface, it also depends partly on events which result from a number of other conditions existing in the region of the intersurface. In this respect the development of quasi-turbulent plastic flow is analogous to the development of true turbulence in the flow of a liquid, in that the critical value, or number at which a laminar flow will be converted to a turbulent flow in a flowing fluid medium, depends not only on the differential flow rate existing within the fluid medium, but depends also on a number of other factors such as the surface condition at the surface of the flow conduit, the shape and dimensions of the flow conduit, the viscosity of the fluid, and a similar number of other factors which may be termed turbulence-controlling factors.

From this analogy it will be appreciated that the practice of the present invention involves not only establishing those conditions during plastic deformation which contribute to a high differential plastic flow in the region of an intersurface, but involves also the control and adjustment of other quasi-turbulence controlling factors which promote the development of the quasi-turbulence at lower rates of differential plastic flow in the region of the intersurface.

Generally, however, a key factor in the practice of the positing method is the development of the sufficiently large differential plastic flow so that, with the contribution of these other factors, a quasi-turbulence is induced in the region of the intersurface where bonding is to occur. Accordingly, it is not possible to practice the subject method either by the development of a high differential plastic flow alone, or by the employment alone of other factors which contribute to the inducement of quasi-turbulence in material undergoing high differential plastic flow deformation, where neither of these factors alone produces the quasi-turbulence, or where their combination is also insufficient to produce the quasi-turbulence.

Moreover, it should be appreciated that the quasi-turbulence can be produced, and a disruption and disturbance of an intersurface between plastic materials can be effected without at the same time producing a bonding between elements having substantial differential plasticity. The development of such quasi-turbulence will, however, produce a substantial increase of surface roughness at the intersurface where this intersurface initially lacks such roughness.

Characteristics of intersurface agitation

The foregoing description presents a picture of the manner in which the quasi-turbulence and attendant agitation is induced at an intersurface where sufficient differential plastic flow rates are achieved. Other factors affecting the inducement of quasi-turbulence are discussed below following specific illustrative examples. In this portion it is desired to point out the nature of the disruption of the intersurface which occurs under the influence of this quasi-turbulence, and certain characteristics which will be found in the disrupted surface of the products which are formed.

One of the principal overall effects of the agitation of the intersurface region which may be readily seen in the absence of bonding, is an increase of surface roughness or an effective extension or enlargement of the actual surface area within an apparent unit area of the intersurface where such roughness was initially absent. It is in fact by the study of the surface condition following attempts at posit bonding that an indication can be obtained, in accordance with the teaching herein, of the effectiveness of a combination of steps used in obtaining a desired bonding, and of the manner of modifying the steps of the combination to obtain or to improve such bonding.

By an apparent unit area is meant the portion of the surface which is present on a measured geometric unit area of a specimen of material. For example, if the unit area is one square inch, the apparent surface area of this specimen will also be one square inch. However, the actual surface area will be greater than one square inch depending on the degree of roughness or the extent of irregularities in the surface.

One characteristic which can be readily observed in the products subjected to positing is a sharp increase in the actual surface area of an intersurface, even though the process used in positing would normally be expected to decrease the actual surface area. This is illustrated in the case of forge roll positing. Normally, it is expected that among the effects of the rolling of a specimen, having surface asperities at an intersurface, will be a reduction in the height of the asperities, and a decrease in the number to be found in an apparent unit area of the intersurface of the rolled specimen. This flattening and extension of surface asperities should normally be expected both because the high pressure exerted by the rolls will tend to reduce the height of the individual asperities, and because the extension of the surface with the extension of the sheet during the rolling should reduce the concentration, or number of asperities per unit area, particularly in the rolling direction, i.e., the direction in which the specimen is extended.

It is quite at variance with normal expectation therefore to find that there is a large increase in the concentration of asperities at the intersurface of a specimen following rolling, as compared to the initial concentration in a unit of the initial specimen area, particularly where the specimen surface was initially in a relatively smooth condition. This is more evident from the large increase in the total extent of intersurface roughening over the extended area of a rolled specimen which corresponds to a unit of the prerolled specimen area. For example, an intersurface of a duplex assembly which is doubled in length in roll positing can have a greatly increased concentration of surface asperities in the intersurface of one-half of the posited assembly corresponding to the original dimensions of the assembly. However, in addition to the greatly increased surface disruption of a portion of the posited intersurface corresponding in dimensions to the original intersurface, the amount by which the intersurface disruption of the original intersurface will have increased will be double that of the increase within a dimensionally corresponding specimen of the posited intersurface.

What is even more unexpected, as will be pointed out more fully below, is that by employing certain combinations of positing variables, the concentration of surface irregularities at an intersurface can be made to increase as the portion of the initial unit specimen area, which remains in a unit of rolled specimen area, is decreased. This anomolous result can be obtained in positing by the generation within each unit of apparent surface or apparent interfacial area of a higher and higher concentration of asperities during the roll positing operation as the amount of elongation of the posited specimen and the number of units of apparent surface area or interfacial area are increased.

The appearance of surface asperities which can be produced by positing is evident from FIGURE 3 which shows, in plan view, the surface of a sample of metal, initially having a relatively smooth and uniform mat finish such as is obtained by wire brushing, after this sample has been subjected to a positing-type roll forging extension to induce a surface agitation of an intensity below that needed for complete posit bonding. It will be observed from FIGURE 3 that a portion of the surface 33 is in a relatively smooth condition whereas another portion 34, is substantially roughened. The explanation for this difference is that the smoother surface is that which passed through the roll forging as a single layer of material whereas the portion of the material which shows the roughened surface passed through the roll forging beneath a thin layer of cladding metal of substantially lower plasticity.

A principal result of this increase in surface asperities during positing, and a principal phenomena on which the success of the present method depends, is the formation of nascent surface at an intersurface in a direction out of the initial plane of the intersurface. This is in contrast to previously employed roll forging of duplex assemblies, for example, which have depended on the effect of shearing forces, i.e., on the formation of nascent surface generally within the initial plane of the intersurface as high pressure is exerted therethrough, and as a linear and essentially unidirectional extension occurs in the materials at the intersurface. In effect, a contrasting novel result which is obtained in the practice of this aspect of the present invention, during the induced agitation of the intersurface, resides in the development of a component of displacement of the material at the intersurface in a direction normal to the intersurface. The result of this displacement is the formation of localized enlargements of the surface out of the initial plane of the intersurface, which localized enlargements can be seen to correspond, in the surface of certain unbonded posited specimens, to the presence of visible surface asperities or of a roughened condition in the surface. In the case of certain bonded specimens the localized surface enlargement out of the initial plane of the intersurface, and of extensions thereof, may be seen in a photomicrograph of the interface formed when an assembly of sheets is bonded by roll positing.

For example, referring back again to FIGURE 1, it will be seen that in this figure, some of the aluminum along the interface has been displaced out of a plane, which may be represented by a straight line extending across the figure in the region of the interface, to provide peak-like protrusions or penetrations of the aluminum across the initial plane of the intersurface and into the stainless steel. Similarly, depressed areas or troughs are seen in FIGURE 1 which may be regarded as sites where, on a relative basis, the stainless steel has protruded across the intersurface in forming the interface and thus into the aluminum. This collectively represents a relative interpenetration of the material of each component of the composite across the intersurface as the interface is formed therefrom in posit bonding.

One of the unique phenomena which accompanys positing is the penetration of what may be normally regarded as the softer material of the assembly into what may normally be regarded as the harder material. The positing effect is accordingly not dependent primarily on the penetration of raised portions of a harder material into a softer material.

Accordingly, it will be evident that the effects obtainable by positing, by roll forging, and by similar operations do not depend either solely or primarily on a linear extension of the intersurface in the rolling direction. Rather, roll positing may be characterized in a substantial increase of the actual surface area within a unit area of an intersurface which is initially in a relatively smooth condition. Where the initial intersurface is not smooth, positing, and the intersurface disruption which attends positing, produces a distinctive rearrangement of the surfaces as will be described more fully below. Where bonding is achieved, this disruption and localized enlargement of the intersurface causes an intermingling of the material across the initial intersurface boundary. Where bonding is incomplete, the localized disruption gives rise to the roughened condition of the posited surface.

The bonding which is developed depends on the creation of interatomic bonding forces between the atoms at the respective nascent surfaces of each of the component elements of the assembly, as these nascent surfaces are formed, and as they are urged into intimate contact under the high pressure of the roll forging. The intersurface agitation therefore simultaneously performs two operations necessary for strong interatomic bond formation. In the first place, it enlarges the intersurface at least partly out of the initial plane of the intersurface and in doing so generates nascent surface in the confronting surface. Secondly, it simultaneously engenders intimate contact between these nascent surfaces across the intersurface under the high pressure of the roll forging operation. The result is the creation of an interface directly between the material of the respective elements of the posited assembly.

Posit bonding constitutes an improvement over the normal pressure bonding, as by roll forging, as these processes depend primarily on the simultaneous extension of two elements of an assembly. During such conventional pressure bonding, there is no increase in the actual surface area within a unit of apparent surface of the specimen during the roll forging. By contrast positing provides a remarkable increase in the degree of bonding through a greatly increased development of nascent surface, per unit of apparent intersurface due to the localized enlargements of the intersurface out of the plane of the intersurfaces. Moreover, this nascent surface is produced under conditions of high pressure so that there is intimate contact between the nascent surfaces of the two elements of the assembly.

Posit bonding can be achieved in fact with no permanent linear extension of the material of the assembly which is posited. Such positing in the absence of linear extension of the intersurface is illustrated in Example XI below where the overall linear dimensions of the intersurface between two elements is reduced in forming the interface during the positing operation, but where a strong interatomic bond is formed between the materials of the component elements of the composite article formed.

It will be appreciated that the inducement of this interpenetration is an essential element of the formation of posit bonds in accordance with the present invention. However, it will also be evident that the bond, once formed, can persist although the interpenetrated surface configuration may not have persisted. In other words, although the interpenetration is essential for the increased interatomic bonding made possible by the positing process, the increased interatomic bonding can remain although the evidence of interpenetration may have been erased by further treatment of the posited specimen.

Periodicity of asperities

Figure 3:
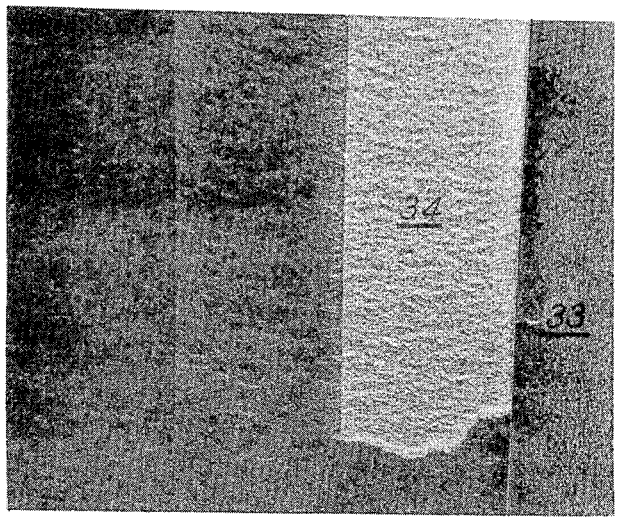
FIGURE 3 is a photographic view, at a four fold magnification, showing the change in surface appearance of a metal specimen from treatment according to the method described herein.

It will be observed from the magnified view of the surface roughening which results from the use of the roll positing operation as shown in FIGURE 3 that there is no simple and uniformly symmetrical alignment of the locally enlarged portions or asperities over the entire extent of the metal surface. Nevertheless, there are recognizably distinct ridges and depressions in the surface, or other forms of irregularties which were not present in the specimen surface before positing and which contribute to the apparent increase in the roughness.

From the specimens surfaces shown, positing does not produce a series of uniformly spaced ridges extending the full width of the rolled specimen and lying parallel to the axis to the roll. However, within each area where a number of these localized surface enlargements have been produced by positing, if a single line is followed over the contour of the roughened surface in the direction of the application of positing energy through the area, i.e., the rolling direction, there is observed a somewhat irregular periodicity or wave form which characterises the distribution of the surface. Although somewhat irregular in distribution, the asperities produced by positing have a greater length than width, with the longer dimension aligned generally parallel to the axis of the rolls.

Before entering into a description of the periodicity of asperities produced at an intersurface by positing, it is essential to understand that the energy applied in deforming the assembly to produce positing can be applied entirely from the exterior of the assembly and, moreover, can be applied continuously and uniformly to the exterior of the assembly. To obtain periodicity in the intersurface disruption, there is no need to introduce a periodicity into the energy applied in deforming an assembly of elements.

In this way positing is distinct from a number of other methods of producing bonds at an intersurface. For example, the relatively recently developed method of ultrasonic welding depends on the imposition of a high frequency motion on an assembly of elements from the exterior of the assembly. This high frequency motion is not generated internally of the assembly to be bonded as in positing, but rather is transmitted to the interior of the assembly from the outer surfaces thereof. This externally imposed vibratory energy acts at least partially at the intersurface of the assembly and can produce a substantial disruption of this intersurface in forming a bonded interface.

Photomicrographs of the interface between elements which have been bonded by ultrasonic welding show a disruption of the material at the interface and substantial swirling and relatively random interpenetration of metal across the initial plane of the intersurface. There is no evidence, as there is in photomicrographs of posited specimens such as those shown in the FIGURES 1A and 3, of the action of intersurface disrupting energy which has proceeded in a single direction along the intersurface and produced a disruption in a wave form.

In ultrasonic welding the necessity for the transmission of a high frequency motion through the elements of the assembly to be bonded places substantial limitations on the utility of the method. One such limitation is that only relatively thin gage material can be bonded in this way. Another limitation is that the bond can be formed in only a limited portion of the assembly at one time.

By contrast posit bonds can be formed between materials of substantially greater thickness and can be formed between entire sheets or elongated strips of material at very rapid rates.

For example, in roll forge positing, an assembly of elements can be introduced into the nip of the roll, and the assembly can then pass through the rolls as in a conventional roll forging operation. No wave form of energy or other wave inducing motion need be added to the normal roll forging in order to produce asperities in wave-like formation or other intersurface disruption which is characteristic of positing. Rather, this disruption can result from effects which occur entirely within the assembly as it passes through what is otherwise a normal roll forging.

Roll forge positing differs from conventional roll forging in the combinations of forging variables which are selected and applied in carrying out the forging of specific assemblies of deformable elements in a manner which is otherwise conventional for roll forging. The difference in result is a greatly increased intersurface disruption, particularly that which occurs in a plane outside the initial plane of the intersurface as discussed more fully above.

Returning now to a description of the periodicity of the asperities produced by positing, the asperities are formed as the deformation of an assembly of elements proceeds progressively and essentially unidirectionally along the length thereof. The deformation can be regarded as the movement of a strip of material, having a width corresponding to the width of the specimen in which deformation occurs, by a single application of deforming energy, past a station where the deforming energy is applied continuously. Within a given length of such a strip asperities are produced as a progression of raised and depressed zones from a concentration of the deforming energy.

An essential condition for the inducement of positing during this deformation is a concentration of a substantial portion of the energy of deformation into the region of the specimens immediately proximate the intersurface. Where such a portion of the deforming energy is concentrated in this region the very high shearing action occurs, principally in the more plastic material, and a large differential displacement takes place in the relatively thin layer of material proximate the intersurface.

The high differential displacement or high shearing in the material at the intersurface gives rise to the quasi-turbulence. Evidently, where this continuous deformation occurring at the rolls produces the exceptionally high shearing proximate the intersurface, the quasi-turbulence is manifested in a relatively irregular and partially interrupted wave motion. For this manifestation of the quasi-turbulence, therefore, the positing may be thought of as the progression of a wave front of intersurface disrupting energy along the length of the assembled specimens to which the deforming energy is applied. The inducement of the quasi-turbulence in this manner to produce asperities in a wave form is accordingly referred to herein as the generation of a positing wave.

Figure 4:
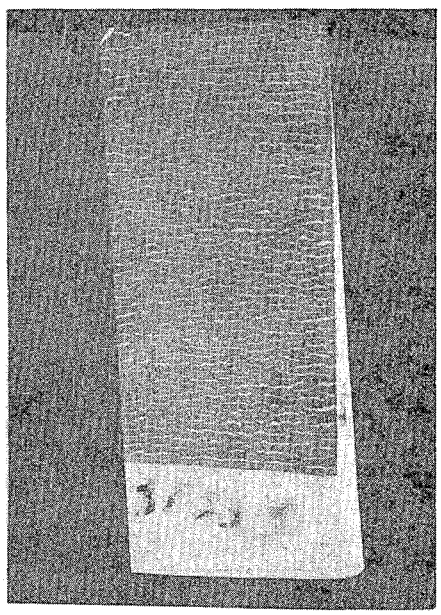
FIGURE 4 is a photographic view of the actual size of a specimen clad with a metal surface layer as described herein.
Figure 5:
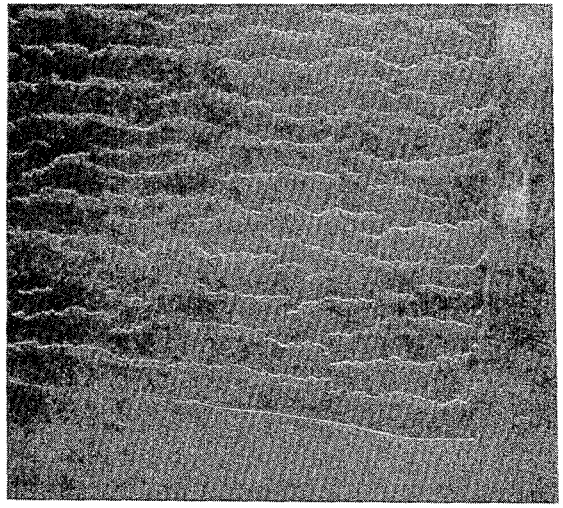
FIGURE 5 is a photographic view at a four fold magnification showing a portion of the specimen seen in FIGURE 4.
Figure 6:
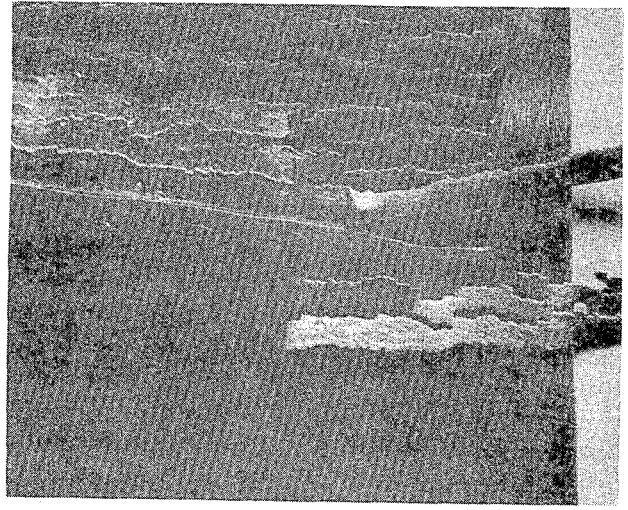
FIGURE 6 is a view similar to FIGURE 5 but showing portions of the metal cladding removed and inverted.
Figure 7:
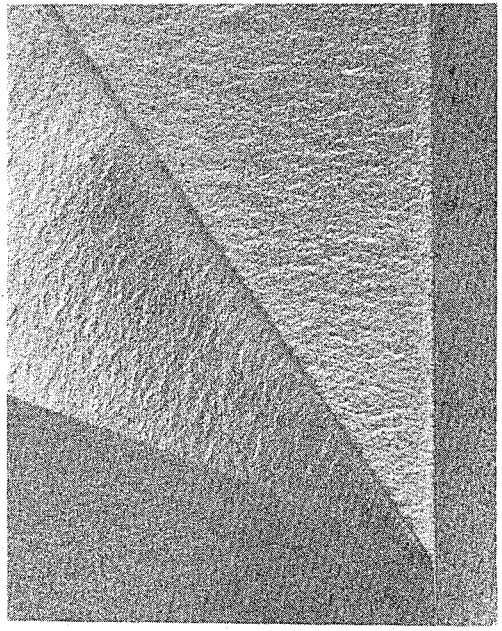
FIGURES 7 and 8 are photographic views at a four fold magnification showing specimens similar to those seen in FIGURE 3.
Figure 8:
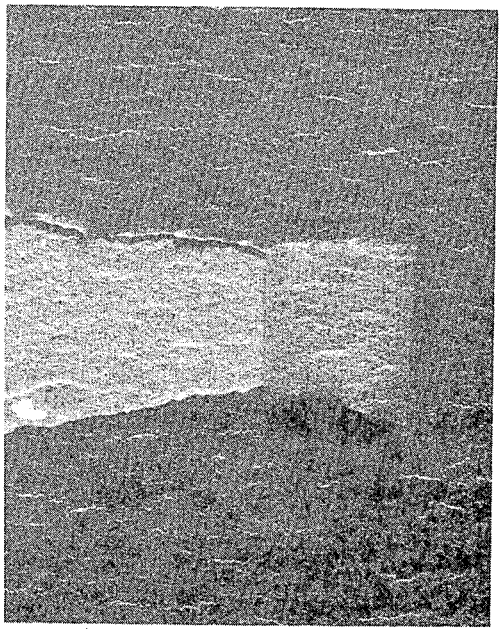

In general, improved bondings can be attained where an increase is developed in the actual intersurface area through the passage of a positing wave. Positing waves may be regarded as having characteristics corresponding to most forms of wave motion, namely, amplitude or intensity, and frequency or wave length. Improved initial interatomic bonding can be produced where an increase is produced in the amplitude of the positing waves and an increase can be achieved also where the frequency of the waves is increased, where the amplitude is not reduced, as this results in an increase in the extent of nascent intersurface produced. It must be realized, however, that it is possible to so increase the amplitude of the waves that a rupturing of the material itself can be produced, and this result is indicated in FIGURE 4. This figure is a photograph of a titanium metal cladding which has been posit bonded directly to an aluminum substrate, showing the ruptures produced in the titanium cladding by the positing. In this case the positing operation produced a wave of excessive amplitude for the tensile properties of the titanium cladding strip.

A stronger bonding can be achieved between the titanium cladding layer and the aluminum substrate, without the rupturing of the titanium, where the amplitude of the positing wave is decreased, but where the frequency of the wave is increased. In this way it is possible to create the periodic low amplitude intersurface disruption of the type which is illustrated in FIGURE 1 for bonding of a stainless steel cladding to an aluminum substrate.

The intersurface disruption which is induced in positing, and which takes the wave form described here, occurs to displace material out of the initial plane of the intersurface to cause a development of nascent surface at both surfaces of the intersurface. This interpenetration of the materials and exposure of nascent surface serves to incite a strong interatomic bonding therebetween under the high energy which is concentrated in the region of the intersurface during the passage of the positing wave.

Generally, modification of positing parameters which causes increased turbulence at an intersurface causes an increase in the frequency in the positing waves, whereas a modification of positing parameters which causes an increase in differential displacement of the plastic material in the region of the interface causes a decrease in the frequency in the positing wave. The amplitude of the positing waves may be regarded as dependent on the degree of available energy which can go into the inducement of turbulence at the intersurface relative to the linear rate of movement of the positing wave, and which in fact does go into such inducement to turbulence at the intersurface.

An increase in the linear rate of movement of the positing wave may be viewed conversely at an increase in the linear rate of movement of the assembly through a positing station. Where the positing station is a rolling mill, the linear rate of movement of the positing wave may be increased by increasing the linear rate at which the assembly passes through the rolls.

An increase in the amplitude of the positing wave may be accomplished for example by increasing the energy of deformation. In a roll forging operation, this can be accomplished by increasing the percentage reduction given to an assembly for a single pass through the rolls.

There are a number of other factors which may also be modified or combined in practicing the present invention. These are the quasi-turbulence controlling factors and are analogous, as indicated above, to the factors which control the inducement of turbulence in a stream of liquid. Where a positing wave is induced at the intersurface, the factors which control the quasi-turbulence provide a controlling influence on positing wave as well.

An illustration of one of these factors will aid in making their significance clearer.

Under normal conditions a tin cladding can be posit bonded to a brass substrate by roll forging if the rate of linear movement of an assembly of tin strip on brass substrate strip is sufficiently high. Where this linear rate of movement is quite high, the posit bonding can be carried out without the aid of any heating.

However, this same positing can be effected at a lower linear rate of movement of the assembly through the rolls where the brass substrate is fed to the rolls in a heated condition of the order of 150° C. although the tin is not preheated.

The positing is obtainable at the lower linear rate of movement because the differential heating of the elements to be posited has been found to be one of the controlling factors in the inducement of positing.

From this illustration it will be evident that the practice of this invention depends in large part on the selections and combinations of those positing factors which enhance the posit bonding of the particular combinations of deformable materials which are to be bonded.

With regard to the modification of various parameters to induce, to modify, or to strengthen this positing wave, it is important to observe again that it is conventional for various forms of energy to be delivered to an assembly of elements, and to work and deform these elements in a manner which may appear to be quite similar to that used in positing.

However, regardless of such apparent similarity, what is strikingly different from any bonding practices known heretofore is the remarkable bonding results produced, and the remarkable variety of novel bonded products through use of the posit bonding practices taught herein.

What is equally or more important is that, in accordance with the teaching herein, it is now possible to select and modify treating and forming practices and to use novel combinations of these practices to effectively optimize the results obtainable through positing. Such optimum results are attainable by the application of the principles taught herein, inasmuch as they are deemed to underlie the invention and to enable those skilled in the art to exercise a control over the practice of the invention through the greater understanding thereof.

The understanding of the invention can also be improved by the use and application of information derived from studies of other phenomena which are analogous to the phenomena which occur during the positing and posit bonding of materials having different degrees of deformability. Because positing depends primarily on deformation to produce the differential motion which results in the formation of the wave phenomena at the intersurface, many of the positing factors are best expressed in terms of their relation to, or of their effect upon, deformability. However, there are numerous analogous phenomena from which useful understanding of the positing process can be derived, although they are not as directly dependent on deformation.

Examples of analogous phenomena may be found in nature in the development of intersurface disruption at the intersurface between materials which have different flow properties. A very familiar illustration of this intersurface disruption is observable in the effect of moving air on the surface of a relatively large body of water. For example, there is an extraordinarily close resemblance between the wave form observed in the surfaces of posited materials, as seen in FIGURES 3 through 10 of this application, and the wave form observable by viewing a relatively large body of water, from a substantial height directly above the water, where air is moving over the water surface at a rate sufficient to generate a wave movement at the water surface.

Similar analogous intersurface disruption phenomena may also be found where water moves at a sufficient rate over an expanse of sand or other material which provides an impressionable surface in contact with the moving fluid. A similar wave form may be found in large expanses of material such as sand over which air may move at velocities sufficient to cause a movement of material at the interface and to impart surface configurations thereto. A number of these analogies are described in an article appearing in the magazine "Science," volume 136, number 3519, dated June 8, 1962, by G. F. Jordan, and entitled "Large Submarine Sand Waves." In this article it is pointed out that the orientation and form of such sand waves are influenced by some of the same factors that shape desert sand dunes.

What is believed to have been totally unexpected is that the phenomena which have been observed to occur in such media on a very large scale have a counterpart which occurs on a much reduced scale in deformable materials found in industrial use, and that the means for deforming these materials, now in use on an industrial scale, can be modified and combined, to make novel practical use of the phenomena on an industrial scale.

Because there are analogous relationships between the various interfaces at which intersurface disruption may be produced by the relative movement of the materials at the intersurface, it is possible through the use of understanding obtained by the study of such analogous disruptive phenomena to modify the parameters combined in practicing the positing process so as to improve the results which are obtained thereby.

It is within the scope of the present invention to deform assemblies of elements having different deformabilities to produce positing phenomena at an intersurface therebetween, and to modify the parameters of the deforming practice based on the effects thereof on the positing phenomena produced, to optimize the development of the disruptive intersurface phenomena.

The use and adjustment of various combinations of positing factors will be made clearer by a consideration of a number of examples which follow. It will be understood, however, that these examples are given for illustrative purposes and should not be interpreted as limiting or defining the scope of the invention.

EXAMPLE I

The following is a detailed description of the general procedures used in the specific examples which follow. Except where otherwise set out in the specific examples, the general manipulative operations described here are those used in preparing and bonding the specimens of the specific examples.

A strip of base sheet metal, as for example, a strip of aluminum metal of 6 inches in length, 4 inches in width, and having a thickness of 0.125 inch, was first cleaned preparatory to joining. The cleaning steps included a wet chemical cleaning treatment such as a degreasing of the metal surface, as by immersion in a degreasing solvent such as trichlorethylene, or in an inhibited solution of an alkaline cleaning agent such as a solution of trisodium phosphate in water at 160° F. Following such a wet chemical cleaning treatment, the surface to be united was rinsed in flowing cold tap water.

After a wet chemical cleaning treatment, the surfaces to be joined may be mechanically cleaned and roughened by mechanical wire brushing, as with a cleaned stainless steel rotary wire brush, prior to being subjected to any thermal treatment.

A strip of a cladding metal, such as stainless steel, having a width approximately corresponding to those of the aluminum strip but having a length perhaps 20 percent greater than that of the base metal and a thickness of approximately one/fiftieth to one/tenth of the aluminum base, was cleaned in a manner such as that described for the aluminum above.

The cladding strip was then folded at one end to form a clip which would receive the lead edge of the aluminum strip for introduction into the nip of the rolls of a rolling mill. The cladding strip was also bent in the form of an arc resting at its ends on the base sheet but suspended along its length out of thermal and physical contact with the base.

After preparing the cladding and base metal parts in this way, the base metal only was heated at a temperature, and for a time, to impart the desirable heat to the base. Immediately after removal of the base from a heat supply means, such as a furnace, the cladding strip is clipped on to the lead end of the base metal strip and the assembly is immediately inserted into the nip of the rolls. As the assembly is drawn rapidly between the rolls the clad metal is driven forcefully into physical and thermal contact with the heated base metal.

EXAMPLE II

A specimen of austenitic stainless steel (18–8 type) foil was clad onto a base strip of aluminum alloy 6061 as described in Example I.

The wet chemical cleaning procedure of Example I was followed except that the surfaces to be confronted were cleaned by degreasing in trichlorethylene only. This was followed by a wire brush cleaning of both of the surfaces to be confronted in joining. The cladding strip was bent to have a flat lead edge lying parallel to the base sheet and an arched midsection between the ends of the cladding strip in contact with the base.

The aluminum substrate only was heated to 1000° F. for twenty minutes. Immediately after withdrawal from the furnace the stainless strip was placed on the aluminum base sheet and the assembly was introduced by its lead edge into the nip of rapidly rotating rolls, each having a diameter of about ten inches. The rolls were set at a clearance to provide a reduction of the assembly thickness of about 50 percent in this single pass through the rolls. The assembly was posited in passing through the nip of the rolls at about 150 feet per minute.

Two more assemblies of 6061 aluminum base metal and 18–8 type stainless cladding metal were prepared for roll positing by a procedure precisely duplicating that described above except for the clearance setting between the rolls. For one of these assemblies the rolls were set to reduce the thickness by 65 percent. For the other assembly the rolls were set for a reduction of 25 percent.

The results of these separate positing operations were as follows:

After rolling the sample to be reduced by 50 percent showed very slight edge cracking along both sides of the cladding layer. The stainless steel and aluminum were not bonded at the lead end where the flat portion of the stainless steel rested on the hot aluminum substrate, but an excellent bond was found in along the length of the specimen.

Excellent bonding was also found between the substrate and cladding of the specimen to be reduced 65 percent. It was observed, however, that the gage of the stainless steel was reduced from about .005 inch to about .002 inch. Severe transverse ruptures had developed in the body of specimen cladding similar to those indicated in FIGURE 4. The ruptures were uniformly oriented transversely to the rolling direction and had an appearance and formation roughly analogous to that of expanded metal. The spacing of the ruptures, and between the ruptures, corresponded to that seen in the figure and was approximately uniform.

The specimen to be reduced 25 percent showed the surface roughening which results from the application of positing energy but did not result in significant bond formation.

EXAMPLE III

A composite specimen was prepared by roll positing a base strip of aluminum alloy 1100 to a cladding strip of an austenitic 18–8 stainless steel (type 302) substantially as described in Example I.

Before positing the aluminum was about .070 inch thick and the stainless was .005 inch thick. The metal surfaces were washed with trichlorethylene and wire brushed on the surfaces to be confronted in joining. The aluminum was heated to 950° F. and rapidly assembled. The strips were rapidly assembled and rapidly roll posited with the spacing between the rolls set to produce a stainless clad aluminum composite of 0.040 inch in thickness. Rolling speed was about 150 feet per minute. Satisfactory bonding was found to have been produced over about 75 percent of the stainless steel specimen, the areas of such bonding being found to be distributed in a random pattern.

A sample 3.5 inches square was cut from a well bonded region of the composite specimen and cupped in a standard double acting deep drawing cupping press equipped to first punch a circular blank having a 3.11-inch diameter, and to then deep draw the blank to produce a cup having a 1.125-inch diameter and having side walls approximately 1.2 inches high. The cup formed successfully from the blank with the stainless steel on the outside. The base of the cup thus formed was found to have the unified structure of the posited sheet but the stainless in the sidewall of the cup was ruptured by shearing, although the aluminum base was not ruptured. The bond between the stainless steel and aluminum was good and this was confirmed by metallographic examination.

EXAMPLE IV

The procedure of Example III was repeated with the exception that in this case a base metal specimen of aluminum alloy 6061 and a cladding metal strip of type 302 stainless steel were assembled as described for the roll positing.

The bond which formed extended over about 95 percent of the composite specimen. Some edge cracking and folding were produced evidently due to misalignment of the stainless steel cladding metal on the aluminum substrate as the assembly entered the roll nip.

EXAMPLE V

The procedure of Example III was again repeated with the exception in the case being that the specimens were a one-inch wide hard rolled strip of Zircaloy and a wider base of aluminum alloy 1100.

An extremely strong overall bond was produced between the Zircaloy and aluminum strips. Significant transverse fracturing of the Zircaloy occurred in the head end, i.e., the end which first underwent rolling, where greater deformation occurred in the Zircaloy. At the tail end, where the Zircaloy strip was impressed into the softer aluminum base metal, less deformation to the Zircaloy occurred during the positing although uniform coherent cladding occurred.

EXAMPLE VI

Three base metal strips of aluminum alloy 3003 each having a thickness of 0.125 inch, and three cladding strips of stainless steel each having a thickness of .005 inch, were prepared as described in Example II.

The aluminum specimens were each heated to 950° F. instead of to 1000° F. and, immediately after removal of the aluminum from the furnace, the respective specimens of stainless steel and aluminum were assembled and roll posited at a rolling speed of 50 feet per minute. The rolls were set to reduce each of the assemblies by rolling by 50 percent as taught in Example II.

No bonding or light sticking as by mechanical interlocking whatsoever was produced. The aluminum intersurface which had contacted the stainless steel in rolling had the appearance of having been lightly burnished as a result of the low speed positing procedure.

This duplication of the procedure of Example II but at the lower rolling speed and slightly lower substrate preheat temperature established the significance of rolling speed in the development of good bonding.

EXAMPLE VII

Two composite sheets were prepared as described in Example II, one of type 302 stainless steel on an aluminum alloy 6061 base and the other of type 302 stainless steel on a 3003 alloy base. The rolls were set to provide a reduction of 40 percent and to provide a final gage of .040 for the composite.

Photomicrographic studies of the interface formed in the rolled sheet (prior to cupping) indicated that the deformation patterns in the aluminum results from shearing forces of unusually marked intensity in the region of the interface as is seen in FIGURES 1A, 1B, 2A, and 2B.

The products formed were well bonded composite sheets. Specimens were taken from the composite sheets and cupped in the apparatus described in Example III.

Successful deep drawn cups were made with stainless steel clad on the inside of the cups from both the composite having the aluminum alloy 6061 substrate and for that having the alumina alloy 3003 substrate.

Cups were also made with stainless on the outside but these exhibited sidewall cracking as indicated in Example III.

A stress relief treatment of a specimen of composite material cut from the same composite strip at 500° F. made it possible to prepare the cups with the stainless on the outside with substantial reduction in sidewall fracturing.

EXAMPLE VIII

Two assemblies were prepared for bonding by degreasing and wire brushing the surfaces to be confronted as described in Example I. The two cladding strips were specimens of cold rolled nickel silver having a thickness of .005 inch and the two base strip specimens were annealed aluminum alloy 1100 having a thickness of .107 inch. The nickel-silver composition of the cladding strips was commercial Alloy 165 having approximately 18 percent nickel by weight and the balance copper.

A first assembly of strips was prepared for hot rolling by riveting the edges thereof together and heating the riveted assembly to 950° F. in preparation for cladding.

The second assembly was prepared for rolling by heating only the aluminum to a temperature of 950° F.

Both assemblies were reduced by rolling with the rolls set to give a reduction of approximately 50 percent.

The first assembly produced a composite product in which the cladding was substantially greater discoloration of the external surface of the cladding than that produced on the second assembly. Also the degree of adhesion of the cladding to the substrate was substantially greater and more uniform in the second assembly than in the first.

In addition, both specimens exhibited positing type of rupture in the surface cladding but the spacing of the individual ruptures was spaced apart by an average distance which was about 50 percent greater in the cladding of the second assembly than in the first. The shape of edges of the cladding along the individual ruptures were characterized by the appearance of being stepped to a much greater degree in the second specimen than in the first.

EXAMPLE IX

A cladding metal strip of commercial purity titanium having a thickness of about .002 inch and a strip of aluminum alloy 3004 having a thickness of 0.040 inch were prepared for roll positing as described in Example I except that the wire brushing was performed on the surface of the aluminum strip only. The aluminum strip was heated to 950° F. and roll posited to the titanium strip using care to minimize thermal contact between the strips. The assembly was posited with the clearance between the rolls set to give a reduction in thickness of the assembly of 50 percent.

A strong bond was formed between the two strips and the surface cladding displayed surface rupture in the wave form closely resembling the array of waves on the exposed surface of a large body of water over which air is moving at a relatively low velocity.

EXAMPLE X

Two specimens of 1100 aluminum alloy base metal 0.040 inch thick were prepared as described in Example II by wire brushing one surface of each sheet. A stopweld material was applied in a pattern as described in U.S. Patent No. 2,690,002 to define a foreshortened design for passageways on one surface of one of the two specimens so prepared. As described in the patent the stopweld was imprinted on the face of one sheet preparatory to the formation of tubular passageways between the surface of this sheet and that of a second sheet subsequent to a conventional hot rolling to pressure bond the sheets together in the areas not coated with stop weld material.

Two additional and conforming specimens of aluminum base metal, each having a thickness of 0.040 inch, were prepared as described in Example II, one of aluminum alloy 1100 and the other of aluminum alloy 3004. Both surfaces of each of these specimens were wire brushed as described in Example II, and these specimens were assembled with the previously prepared and stop weld imprinted specimens by spot welding them together in pairs at the four corners of each pair to sandwich one of the stop weld patterns into each of the assembled pair. One wire brushed surface was thus left exposed on the exterior of each spot welded assembly.

Two specimens of type 302 stainless steel, each having a thickness of .005 inch, were prepared for roll positing as described in Example I by chemical degreasing and wire brushing, the surface of the specimen to be confronted with the assembled aluminum sheets.

The assembled aluminum specimens only were heated at 950° F. for thirty minutes preparatory to hot roll positing with the stainless steel. The stainless steel specimens were not heated and were bent to render the brushed surface concave. One of the stainless steel cladding sheets was placed respectively on each heated aluminum assembly immediately after its removal from the oven, and each assembly was immediately hot roll posited through rolls set to give a reduction of 50 percent in one pass. Strong bonds were formed between the steel and aluminum specimens at the newly formed metal interface and the aluminum sheets were strongly bonded together in the portions not covered by stopweld.

The composite specimen was then heated at 650° F. for one hour, cooled, and the latent passageways therein inflated substantially as described in U.S. Patent 2,690,002. The product was an inflated tube sheet of aluminum having a stainless steel cladding firmly bonded to one side thereof.

EXAMPLE XI.—SPIN POSITION

A tube of aluminum alloy 1100 was prepared by extruding to have a wall thickness of about 0.005 inch and an outside diameter of about 0.250 inch. A similar tube of copper was prepared by extrusion to have a corresponding wall thickness of 0.005 inch and outside diameter of 0.250 inch. These tubes were annealed at one end and then side stabbed to expand the annealed end into a larger diameter tubular end portion and a generally conical section between the expanded end and the main body of the tube. The outside diameter of the end portion of each tube was approximately 0.375 inch and its length was between about a quarter and a half inch. Both the copper and aluminum tubes were expanded so that the final outside dimension of the expanded end of the copper tube was 0.375 and the internal dimension of the expanded portion of the aluminum tube was 0.375. Thus, the two tubes were prepared for assembly prior to positing by insertion of the expanded portion of the aluminum tube into the expanded portion of the copper tube.

These two tubes were then cleaned and etched by conventional practices. The copper tube was cleaned by immersion in dilute nitric acid and the aluminum tube by immersion in caustic solution after which each was thoroughly rinsed with tap water and dried. The expanded outside surface of the aluminum tube was roughened without deforming the tube by working with a hand held file. The clean dried tubes were then assembled to provide the roughened outer surface of the aluminum in contact with the inner surface of the copper tube at the respective expanded portions thereof. A steel rod of one-quarter inch outside diameter was inserted through the joined tubes to serve as a mandrel and the assembly was mounted in the chuck of a high speed lathe to grip the copper tube between the chuck and mandrel and to support the remote end of the mandrel in a tail stock, prior to mechanically working the assembly, machine oil was applied to the external surfaces of the assembled tubes.

The mandrel and assembled tubes were then set in rotary motion at a high speed of approximately 1200 to 1500 r.p.m. This rotational speed was selected to correspond, on a tube of the given dimensions, to a linear rate of movement of the copper-aluminum intersurface of approximately 150 feet per minute. The assembled enlarged ends of the tubes were then worked mechanically by application of a single point, non-cutting tool which was blunt at its working contact. The tool consisted of a hardwood desk ruler which was supported on the carriage of the lathe as a fulcrum support and was urged upward at its metal working end against the lower side of the rapidly rotating tube and mandrel assembly by hand pressure exerted downward at the remote portion of the ruler. In working the expanded portion of the tube assembly, the ruler served as a spinning tool and was pivoted about its point of fulcrum support to advance the metal working edge of the ruler into and along the expanded portion of the tube assembly to complete the spinning operation in a period of less than ten seconds. In order to bring the working edge into contact with the entire expanded surface of the tubes, the tool was first applied at the expanded portion of the copper tube and it was moved along the length of this expanded portion and then onto the expanded portion of the aluminum tubes to work them into contact with the surface of the steel mandrel. The final diameter of the spun area of the composite was approximately equivalent to that of the starting dimensions of the aluminum and copper tubes.

EXAMPLE XII

Several specimens of aluminum having a thickness of about 0.040 were prepared for positing as described in Example I. Several specimens of high purity silver having a thickness of 0.001 inch were also prepared for positing by solvent degreasing as described in Example I.

In this example, the sample of aluminum was an alloy containing a small percentage of tin as described in copending application for patent, Ser. No. 171,114, filed Feb. 5, 1962, now Patent No. 3,186,836.

Each of the aluminum specimens was heated in an oven maintained at a temperature of about 700° F. for a period of about 10 to 15 minutes. The aluminum was removed from the furnace and the silver was posited thereto employing a rolling speed of about 200 feet per second following the procedure set out in Example II.

In positing the clearance between the rolls was set to give a reduction of approximately 50%. The measured final gage of the composite specimen was between 0.022 and 0.024. A piece of the silver cladding which was bonded to the aluminum was removed by mechanical stripping and its thickness measured. The thickness of this silver cladding was found to be aproximately ½ of 1 mil.

Figure 9:
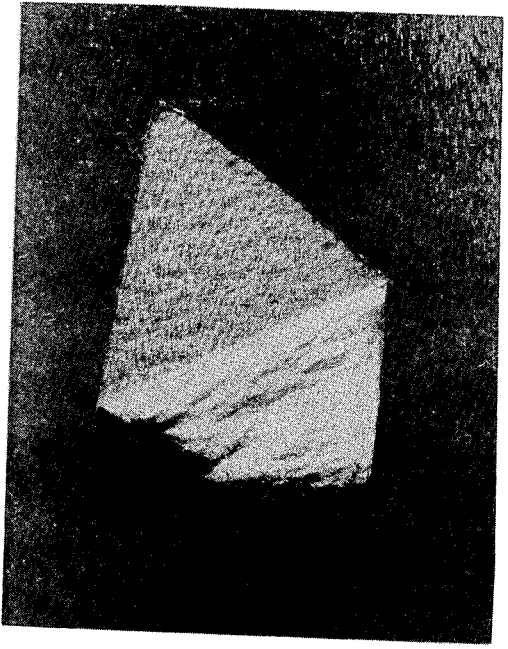
FIGURES 9 and 10 are views similar to those of FIGURES 7 and 8 and showing the formation in the metal surface beneath claddings of silver.

FIGURE 9 is a photograph showing a surface of a specimen prepared as described above at a magnification of about four fold. In this photograph, the rolling direction lies in the direction of the linear markings on the specimen surface. The rolling proceeded from bottom to top of FIGURE 10 in positing the silver to the aluminum surface. The figure accordingly shows the tail end of the cladding, partly as it was posited to, and inlaid in the surface, of the aluminum substrate, and partly after it has been peeled back to expose the surfaces which had been subjected to the positing action. The characteristic wave form of the surface asperities are clearly evident in the aluminum, and to a lesser extent in the exposed underside of the cladding.

EXAMPLE XIII

The procedure of Example XII was duplicated with the exception that in this example the specimens of silver cladding metal had a thickness of approximately 0.005 inch rather than the 0.001 inch thickness as used in Example XII, and the rolling speed was about 100 feet per minute rather than the 200 feet per minute as used in Example XII.

A firmly bonded cladding was produced on the aluminum substrate where the percentage reduction was set for 40% and higher. Rupturing of the cladding occurred at the higher percentage reductions.

Figure 10:
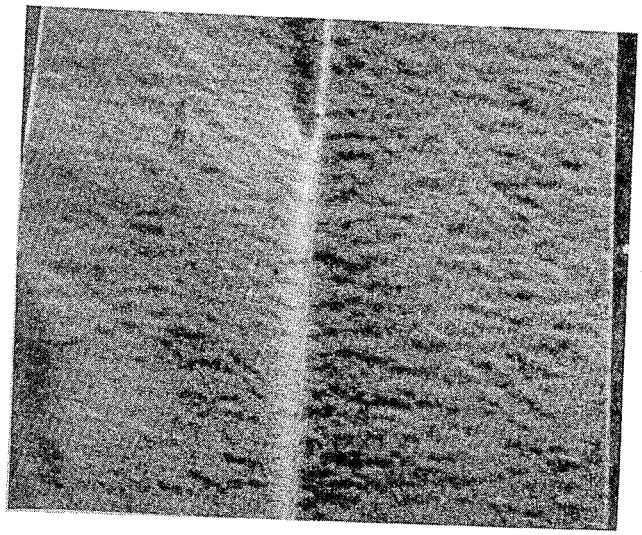

A specimen prepared in this manner and exhibiting the wave pattern of asperities is shown in FIGURE 10.

EXAMPLE XIV

The procedure of Example XII was again duplicated with the exception that in this case 0.002 mil copper was used in place of the 0.001 mil silver, the copper in this case being chemical grade foil, meaning that the copper was of approximately 0.9999% copper purity or higher.

Prior to bonding the copper specimen was cleaned by pickling in a solution of approximately 25% $HNO_3$ in water. The aluminum sample was prepared also as described in Example XII with surface wire brushing and solvent degreasing, but was not etched. The copper sample was neither wire brushed nor solvent degreased.

A series of 5 different rolling reductions was carried out. Before rolling each of the aluminum specimens was about 2 inches wide by 5 inches long and had a thickness of 0.040 inch approximately.

A series of 5 different rolling reductions were performed with the rolls set at values to give reductions of the assemblies ranging from about 20% to about 65%, with 3 intermediate values, at approximately equal percentage increments.

The sample posited at approximately 20% reduction was very weakly bonded and exhibited edge peeling.

An optimum bonding was found at reduction values of between approximately 30 and 40%.

At reductions of approximately 50% and above transverse fracturing was observed in the thin copper cladding and the fracturing increased at the higher reduction percentage.

It was possible to reduce this copper thickness to an approximately transparent thickness where the silvery appearance of the aluminum began to become apparent through the copper deposits formed on its surface by this bonding.

Roll positing of Mylar

Based on the results obtained from positing of various combinations of alloys as described above it was postulated that a bond could be formed directly between a pair of materials other than a pair of metal specimens by a roll positing where this positing exposed nascent surface of materials of suitable differential plasticity. If the conditions of rolling and the conditioning of the surface of the two materials were appropriate, when applied to materials of high plasticity under rolling conditions, the present method can be employed in bonding materials having sufficiently distinct levels of formability or plasticity to permit a positing phenomena to be developed at the intersurface therebetween. In some cases, the method of bonding highly plastic materials to metals by positing will work better when these materials are posited to base metals which form tenacious surface coatings by chemical reaction such as oxidation, to form surface oxides either by surface oxidation reactions, or by electrochemical or other treatment.

The deposit of a plastic material on a metal base may be employed either to form a finished product or the plastic may form an intermediate layer for the deposit of other surface layers, either of plastic, of metal, or of other compositions.

The class of polymers and other plastic material which may be joined to a metal substrate having a highly tenacious oxide surface layer are those which contain an oxygen on a side chain, either as a hydroxyl or as a bonded oxygen. Similarly, plastics which contain fluorine or other halogen elements as an integral part of the polymer can be caused to join to metal base substrates where the fluorine associates with the metal of the base to develop a strong chemical or electronic bond.

In general, the techniques employed in forming a bond between two materials which exhibit differential plasticity at the time of bonding are the techniques which are described in the above examples for the positing of two metal substances, particularly a material of lower plasticity to a material of higher plasticity. The following example illustrates one of the numerous methods which may be employed in forming novel composite products in accordance with this invention.

EXAMPLE XV

Test A

A strip of aluminum alloy 1100 was surface ground in preparation for roll positing. One specimen of the surface ground aluminum was heated to a temperature of 650° F. and a second specimen was heated to a temperature of 165° F. Corresponding specimens of Mylar-D film having a thickness of 0.005 inch were placed on each of the heated aluminum specimens and immediately placed in the bite of a rolling mill to provide an approximate 30% reduction in the thickness of the assembly. The rolling speed employed was about 100 feet per minute.

After the rolling of the specimen formed with the aluminum substrate heated to 165° F. was examined and it was found that only very localized bonding occurred, transverse cracking was highly evident in the Mylar film in the region where bonding was observed to occur. This observation was evidence of the fact that the tensile strength of the Mylar was not sufficiently high to resist the tensile forces imparted to the Mylar film by the positing. The sample heated to 650° F. caused a charring of the Mylar film applied thereto and a localized melting. This charring and melting prevented the uniform deposit of a continuous film on the aluminum substrate.

Test B

The procedure described in Test A was repeated using tough pitch copper as a substrate and employing the other experimental conditions described therein.

Substantially the same results observed in the aluminum substrate in Test A were also observed for the tough pitch copper.

Test C

A specimen of aluminum alloy 1100 was cleaned chemically and anodized electrolytically for one hour to provide an anodized surface oxide layer of approximately 0.008 inch in thickness. The oxide layer thus formed was not sealed as by boiling in water for half an hour. Six samples of the anodized aluminum thus formed were heated in pairs to temperatures respectively of 200° F., 300° F. and 400° F. Dimensionally corresponding specimens of Mylar designated as 500B and having a thickness of 0.005 inch, were quickly assembled and rolled with each of the six specimens of anodized aluminum. In these positing operations two rolling speeds were employed for each pair of heated aluminum substrates. Thus, one pair of aluminum substrate sheets was rolled with the Mylar immediately after removal from the heating furnace at a rolling speed of 25 feet per minute and the other was rolled at 100 feet per minute. The two other pairs of heated aluminum substrate were similarly rolled at these two rolling speeds. The rolling reduction was set to be approximately 30% for each of the six assemblies.

It was found that the best bonded specimens were produced at the 25 feet per minute rolling speed. Also at the 300° F. temperature and lower speed a much more smooth and uniform distribution of Mylar was produced than in the specimen heated to 400° F. and rolled at the lower speed. More severe transverse cracking was produced in the specimen coated to 400° F.

Samples taken from the specimens heated to 300° F. and 400° F. and rolled at 25 feet per minute were annealed at 375° F. for 10 minutes. This caused the Mylar coating to become smooth and glass like.

The rollabiilty of Mylar was demonstrated by reducing a strip of 0.0075 inch thick to about 0.005 by a reduction of about 33%. The rolled sheet was made significantly more transparent by the rolling.

EXAMPLE XVI

Tinning

The method of the present invention is also readily applicable to the cladding of a harder base metal with a softer cladding metal such as a lead, tin, bismuth, antimony, and alloys thereof. In carrying out this process, either the soft metal, which is to be clad as a thin uniform layer onto a base metal may be heated, or the base metal itself may be heated.

In order to provide a clean surface for deposit of a soft metal cladding on a brass substrate, the surface of the substrate was ground employing a belt grinder provided with an abrasive surface. The soft metal was a soft solder strip having a composition of approximately 50% lead and 50% tin. The strip of soft metal was about ⅜ of an inch wide, had a thickness of about 0.025 inch and was about 8 inches long. The brass employed contained 70% copper and 30% zinc, and the strip of this metal used in the positing had dimensions of 0.023 inch in thickness, about ¾ of an inch in width and a length of about 8 inches. In this particular example, the soft metal was placed on the brass base and was rolled, without any preheating, at a linear rate of approximately 100–150 feet per minute. The mill was set to give a reduction of about 50% in thickness in one pass through the mill. It was observed that the soft solder was firmly adherent to the surface of the brass strip forming a pattern closely resembling that of the original strip laid on the brass and having approximately the same width as the starting strip.

Soft solder on aluminum

The procedure described above for the "tinning" of brass was repeated but in ths case using aluminum alloy 3003 as the substrate in place of the brass.

Employing the aluminum strip of 3003 aluminum alloy having a thickness of 0.053 inch and dimensions corresponding to those of the brass strip the soft solder strip was first laid on the aluminum, the composite structure was rolled to reduce the thickness by approximately 50% in one pass employing a rolling speed of about 100 to 150 feet per minute. The results obtained were substantially the same as those obtained with the brass strip.

It was observed in tinning the metal base by roll positing that the high rolling speed employed introduced sufficient work into a metal assembly that a heating and softening of the solder occurred. For this reason where it is desired to maintain the flow characteristics of the solder at normal temperatures, a precooling may be employed. Alternatively, the surface of the roll or the brass substrate may be precooled to prevent excessive development of heat during the roll positing operation.

However, there is an advantage to be obtained in the roll positing of the aluminum without the employment of a precooling where it is desired to form a strong bond between the solder and base metal and where it is desired to effectively flow a liquid soft metal over into contact with, and to bond to a base.

EXAMPLE XVII.—SILVER CHLORIDE ON ALUMINUM

Spacimens of aluminum alloy 1100 approximately 6 inches in length, 4 inches in width, and 0.063 inch in thickness were prepared by chemical degreasing using Oakite cleaner for about 15 minutes at 155° F. followed by thorough rinsing in tap water and drying. The specimens were wire brushed as described in Example I with the axis of the rotary brush approximately parallel to the intended rolling direction.

Sheet specimens of aluminum chloride having a gage of approxiately 0.015 inch were obtained from the Peerless Rolling Company of Union City, N.J. The sheets were cut to strip specimens one inch in width and six inches in length. Because these specimens were substantially transparent, it was possible to observe directly through the silver chloride layer the characteristics of the intersurface disruption which was produced by rolling procedure employed, and to modify the procedure which was employed in order to enhance the degree of intersurface disruption which was obtained. The example illustrates the practice of the present invention by subjecting the number of similar assemblies of elements to deformation to induce a positing type of surface disruption and the progressive modification of one of the positing parameters during this series of deformations. In this way it was demonstrated that it is possible to progressively modify the characteristics of the surface disruption produced, by progressively modifying the combinations of positing parameters employed and in this way to improve the bonding produced at the intersurface during the assembly deformation.

In a first series of scoping tests, the aluminum specimens were heated to a temperature of 700° F. for a minimum of 30 minutes prior to the rolling. After removal of the aluminum specimen from the oven, it was quickly assembled with the sheet of silver chloride and the assembly was immediately rolled at a linear rate of about 100 feet per minute.

A first such test assembly was rolled with the roll set to produce a final gauge of 0.070 inch. The actual thickness produced was 0.064 inch. No surface roughening at the interface or bonding was observed. The aluminum chloride layer changed color.

The rolls were then set to get a final gage of 0.062 inch and the actual gage produced from rolling a second test assembly was 0.057 inch. Again, no bond was produced and the silver chloride layer was again found to have changed color.

The spacing of the rolls was then modified for the third test assembly to give a reduction of about 40 percent and the final gage of the product was found to be 0.046 inch. It was observed that no bonding was formed, but that some surface roughening of the aluminum was produced indicating that the higher percentage reduction favored production of the positing type intersurface disruption.

For a fourth test assembly the roll separation was set to give a final gage of approximately 0.035 inch and the actual gage achieved was 0.038 inch. These was clear evidence, visible through the transparent layer of AgCl, of the positing type of wave pattern developed at the interface by this deformation, and approximately 50 percent of the interface was found to be bonded.

The operation of the rolling mill was then modified to give a linear rate of movement of the specimen through the rolls of approximately 200 feet per minute.

The roll was set to give a final dimension of a fifth test assembly of approximately 0.35 inch and a final dimension of 0.36 inch was observed. No significant adhesion of the silver chloride layer was found.

The rolls were reset to give a final dimension of a sixth test assembly of 0.20 inch and the actual final dimension of the rolled specimen was found to be 0.029 inch at the lead end and approximately 0.020 inch at the trailing end. Poor bonding was found at the lead end, but excellent bonding was observed at the trailing end of the specimen thus produced.

From this set of scoping experiments, it was determined that, under the conditions employed, higher percentage reductions favored the production of posit bonding. It was also determined that at the higher rolling speed, higher reductions favored the production of bonding under the conditions employed.

In a second series of scoping tests the procedure of increasing the percentage reduction was repeated but in this case without the use of differential heating. In this series the aluminum and silver chloride specimens were prepared in the same manner as described above but the dimensions of the aluminum specimens were two inches in width, six inches in length, and 0.038 inch in thickness. The silver chloride specimens used had the dimensions indicated above.

In this second series of scoping tests, five additional test assemblies were used; the rolling speed was maintained constant at about 100 feet per minute; but the percentage reduction was varied from 32 percent to 60 percent.

The roll spacing was set for a reduction of a first cold rolled test assembly to 0.035 inch. This assembly was reduced by 32 percent to 0.036 inch but no bonding was produced.

The spacing was reduced to 0.30 inch for the cold rolling of the second assembly and it was reduced by 42 percent to 0.031 inch.

The spacing was further reduced to 0.015 for the third cold rolled assembly, and it was reduced by 56 percent to 0.023 inch by this rolling. The specimen produced showed excellent extension and significant bonding, but was split along its laterial midpoint in the trailing and to give the strip a general Y formation.

The further reduction of the spacing to 0.012 for the fourth cold rolling produced a composite having a 0.023 inch final thickness dimension, good bonding and the Y formation due to splitting of the trailing section.

The last test assembly of the series was cold rolled between rolls set at a spacing of 0.010 inch and underwent a 60 percent reduction to a final dimension of 0.021 inch. Excellent bonding and a clearly visible interface configuration characteristic of that produced by a positing wave were produced.

Further scoping experiments demonstrated that further improvements in bonding of silver chloride to aluminum could be achieved.

From the foregoing examples it will be evident that a novel method for the bonding of elements which exhibit different plasticities is taught herein. This method is useful in the joining together by direct bonding of an extraordinarily large number of combinations of material. This is particularly well illustrated from the direct bonding together of combinations of elements which have not heretofore been directly joined together without the aid of various bonding aids. Illustrations of such unique bonds are those formed between elements of the refractory metal group and base metals such as aluminum and the like.

In carrying out the described procedure, it is also evident that the positing variables must be controlled within ranges which make possible the formation of improved initial bond strength between the elements joined. Of particular significance in carrying out the method is an appreciation of the variability of the use of the positing variables in combinations which yield improved bond strength and desirable product characteristics.

The achievement of positing in accordance with the teaching of this invention can be made to occur within a range of values for a number of the positing factors.

For example, certain metal elements may be posit bonded although the differential temperature between the elements is maintained at any one of different temperature levels within a range of several hundred degrees. Similarly, where the linear rate of movement of the nascent interface is increased, or the percent reduction of a roll forging step is reduced, or some other positing factor or factors are modified within certain numerical ranges, the posit bond can be formed where the combination of parameters employed results in a sufficient concentration of turbulence inducing energy at an intersurface.

Although it is thus evident that a number of forms of energy may be employed at high specific rates, to induce quasi-turbulence and to concentrate that quasi-turbulence at an intersurface, these and other positing parameters may be varied in accordance with the teaching herein to improve the initial strength of a bond formed by positing. For those situations in which a range of energy factors may be selected, there is usually an optimum value, or combination of values, of the energy factors which should be employed in forming a particular posit bond.

Similarly, there are numerous instances in which the selection of the level at which various positing factors are employed, or various forms of energy are applied, will be predetermined, as for example, by the inherent properties of the starting materials, by certain predetermined requisite properties in the product to be formed, or by combinations of these and other limiting requirements such as the available equipment limitations, cost factors, or similar considerations.

Where the properties of a composite product to be formed or the manner by which it may be formed are predetermined in such manner that a limitation is placed on the variability of certain of the positing factors which may be included in a combination to produce a posit bonded element, it is frequently possible to make some adjustment, in the other factors included in the positing combination to compensate for the limitations which are thus imposed.

In many applications the particular combination of positing energy factors which may be used may be further limited by the presence of certain bonding aids during the positing process, but there are many instances in which substantial gains can be obtained either in product properties, or in the cost of forming, where positing energy is developed at the forming interface even though bonding aids are also employed in forming the interfacial bond.

In general, in accordance with this invention, improved bonding between areas of deformable elements is obtained by applying deforming energy progressively to intersurfaces therebetween to establish high pressure contact and to induce a quasi-turbulent movement of material at said intersurface.

Further, in accordance with this invention, improvements are made in the bonding of elements by modifying the bonding parameters to increase the actual interfacial area with an apparent geometric unit area of interface.

One way in which such improvements are made in accordance with this invention is by deforming a first assembly of elements to induce intersurface agitation, changing a parameter of the first assembly or of the deformation process used in inducing the intersurface agitation in the first assembly, deforming a second assembly with this changed parameter, to induce intersurface agitation, comparing the characteristics of the intersurface agitation produced, and modifying the bonding procedure to increase the frequency and amplitude of the asperities produced at the interface.

What is claimed is the following:

1. An integral composite sheet metal article having good bond strength:
   (A) said composite having a metal core clad with a dissimilar metal cladding, said metal cladding being relatively thinner than said core, said cladding having a lower plasticity than said core;
(B) said core and cladding being bonded together in direct metal-to-metal contact; and
(C) with the interface between the core and cladding being characterized by
(1) having greater metal-to-metal contact area between core and cladding than planar sheets, and
(2) having a wave-like interface with a plurality of peaks, said peaks being irregular in distribution and having a greater length than height.

2. A composite sheet metal article according to claim 1 wherein said core is clad on both sides.

3. A composite sheet metal article according to claim 1 wherein said core is clad on one side.

4. A composite sheet metal article according to claim 1 wherein the interface between the core and cladding is further characterized by the presence of strain markings.

5. A composite sheet metal article according to claim 1 wherein said core and cladding are bonded together in direct metal-to-metal contact in a substantially diffusionless, interatomic bond.

References Cited
UNITED STATES PATENTS

| | | | |
|---|---|---|---|
| 3,233,312 | 2/1966 | Cowan et al. | 29—191 |
| 3,200,491 | 8/1965 | Walker et al. | 29—194 |
| 2,753,623 | 7/1956 | Boessenkool et al. | 29—194 |
| 2,522,408 | 9/1950 | Sowter | 29—194 |

RICHARD O. DEAN, *Primary Examiner.*

D. L. RECK, *Assistant Examiner.*